US012573888B2

(12) United States Patent
Kimura et al.

(10) Patent No.: US 12,573,888 B2
(45) Date of Patent: Mar. 10, 2026

(54) WIRELESS POWER TRANSFER SYSTEM

(71) Applicant: TOYOTA JIDOSHA KABUSHIKI KAISHA, Toyota (JP)

(72) Inventors: Norihito Kimura, Hekinan (JP); Makoto Hashimoto, Seto (JP); Kazutaka Kimura, Mishima (JP); Tomokiyo Suzuki, Shizuoka-ken (JP); Masaki Kanesaki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 634 days.

(21) Appl. No.: 18/115,297

(22) Filed: Feb. 28, 2023

(65) Prior Publication Data

US 2023/0352985 A1    Nov. 2, 2023

(30) Foreign Application Priority Data

Apr. 28, 2022    (JP) ................................. 2022-075277

(51) Int. Cl.
*H02J 50/70* (2016.01)
*H01F 27/34* (2006.01)
(Continued)

(52) U.S. Cl.
CPC ............ *H02J 50/70* (2016.02); *H01F 27/346* (2013.01); *H01F 27/38* (2013.01); *H02J 50/12* (2016.02); *H02J 50/402* (2020.01)

(58) Field of Classification Search
CPC .......... H02J 50/70; H02J 50/12; H02J 50/402; H01F 27/346; H01F 27/38
See application file for complete search history.

(56) References Cited

U.S. PATENT DOCUMENTS

2015/0302984 A1* 10/2015 Kurs ..................... H01F 27/363
                                                                    307/104
2016/0197402 A1* 7/2016 Lee .......................... H01Q 7/06
                                                                    343/788
(Continued)

FOREIGN PATENT DOCUMENTS

JP          2012105451 A  *  5/2012
JP          2015-047046 A      3/2015
(Continued)

OTHER PUBLICATIONS

Decision to Grant a Patent (Translated), Japanese Patent Office Jul. 10, 2025 (Year: 2025).*

*Primary Examiner* — Malcolm Barnes
(74) *Attorney, Agent, or Firm* — Dinsmore & Shohl LLP

(57) ABSTRACT

A wireless power transfer system is configured in such a way that: the power transmitter coil and the power receiver coil each include a coil unit, the coil unit being a pair of coils arranged side by side in a horizontal direction; each of the coils in the coil unit has a shape formed by being wound in a horizontal plane and those coils are configured in such a way that magnetic fields generated by currents are oriented oppositely to each other; a connecting portion is provided on outside diameter sides of adjacent longer sides of the pair of coils, the longer sides being opposed to each other; and the coils are wound to be substantially point-symmetric about a substantially central point of the connecting portion as a point of symmetry in such a way that coil widths of all longer sides of the pair of coils are substantially equal.

2 Claims, 19 Drawing Sheets

(51) Int. Cl.
    *H01F 27/38*            (2006.01)
    *H02J 50/12*            (2016.01)
    *H02J 50/40*            (2016.01)

(56)             References Cited

U.S. PATENT DOCUMENTS

| | | | |
|---|---|---|---|
| 2017/0155280 A1* | 6/2017 | Okamoto | H02J 50/10 |
| 2019/0006884 A1* | 1/2019 | Yuasa | H02J 50/005 |
| 2020/0082977 A1* | 3/2020 | Ishihara | H01F 27/38 |

FOREIGN PATENT DOCUMENTS

| | | | | |
|---|---|---|---|---|
| JP | 2015220345 A | * | 12/2015 | |
| JP | 2017-099239 A | | 6/2017 | |
| JP | 2019-016619 A | | 1/2019 | |
| JP | 2019016868 A | * | 1/2019 | |
| WO | WO-2021051993 A1 | * | 3/2021 | H02J 50/10 |

* cited by examiner

PLAN VIEW

111

MM11

L11

A1

PL1

MM12

L12

WO11     WI11     WI12     WO12

SIDE VIEW

AW1

L11     L12

MM11     MM12

PL1     111

PERSPECTIVE VIEW

PL1     111

L11     L12

MM12

MM11     A1

PLAN VIEW

WO21    WI21    WI22    WO22

SIDE VIEW

PERSPECTIVE VIEW

PLAN VIEW

CROSS-SECTIONAL VIEW

CROSS-SECTIONAL VIEW

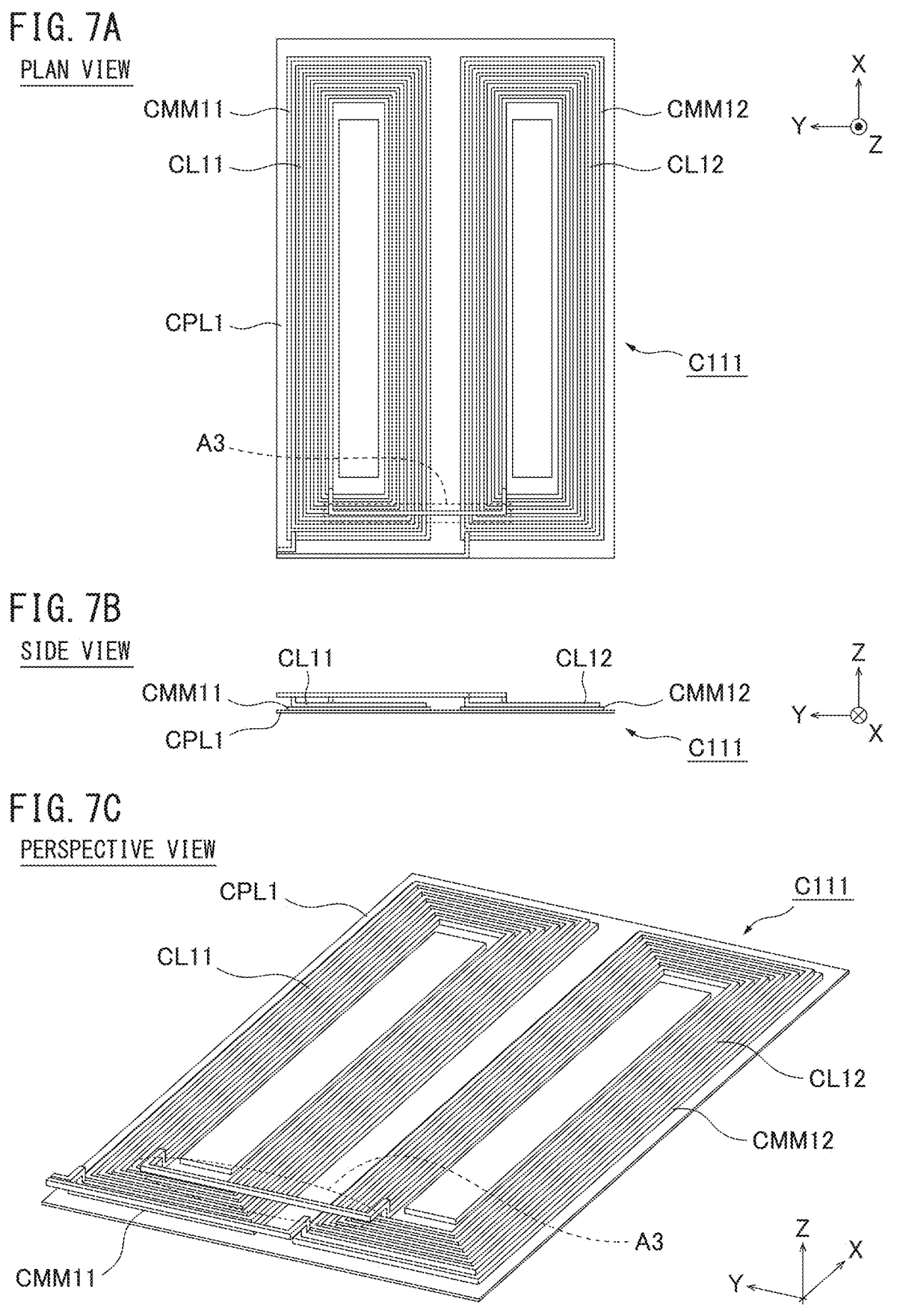

FIG. 7A
PLAN VIEW

CMM11

CL11

CPL1

C111

A3

CMM12

CL12

X

Y ⊙ Z

FIG. 7B
SIDE VIEW

CL11

CMM11

CPL1

CL12

CMM12

C111

Z

Y ⊗ X

FIG. 7C
PERSPECTIVE VIEW

CPL1

CL11

CMM11

C111

CL12

CMM12

A3

Z

X

Y

PLAN VIEW

SIDE VIEW

PERSPECTIVE VIEW

MAGNETIC FLUX DENSITY
IN X DIRECTION [T]
(EFFECTIVE VALUE)

TARGET 1 FOR COMPARISON          PRESENT EMBODIMENT

ASYMMETRIC                    SYMMETRIC

PLAN VIEW

SIDE VIEW

PERSPECTIVE VIEW

PLAN VIEW

CMM41

CL41

CPL2

CMM42

CL42

C411

WO41    WI41    WI42    WO42

SIDE VIEW

CL41

CMM41

CPL2

CL42

CMM42

C411

PERSPECTIVE VIEW

C411

CL42

CMM42

CL41

CMM41

CPL2

FIG. 16A
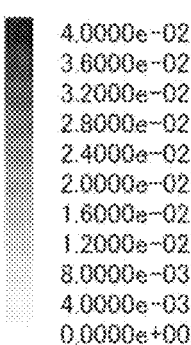
MAGNETIC FLUX DENSITY
IN Y DIRECTION [T]
(EFFECTIVE VALUE)
4.0000e-02
3.6000e-02
3.2000e-02
2.8000e-02
2.4000e-02
2.0000e-02
1.6000e-02
1.2000e-02
8.0000e-03
4.0000e-03
0.0000e+00
FIG. 16B
FIG. 16C
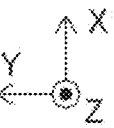
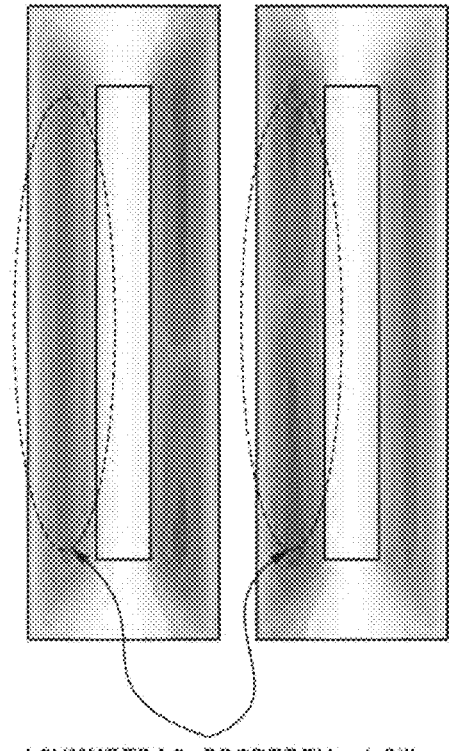
TARGET 2 FOR COMPARISON
PRESENT EMBODIMENT
ASYMMETRIC PROPERTY: HIGH
ASYMMETRIC PROPERTY: LOW

PLAN VIEW

MM31
L31
PL1

MM32
L32
111

A5

X
Y←⊙Z

SIDE VIEW

L31
MM31
PL1

L32
MM32
111

Z
Y←⊗X

PERSPECTIVE VIEW

PL1
L31

111

L32

MM32

MM31        A5

Z
X
Y

PLAN VIEW

SIDE VIEW

PERSPECTIVE VIEW

WIRELESS POWER TRANSFER SYSTEM

CROSS-REFERENCE TO RELATED APPLICATION

This application is a national phase of Japanese Patent Application No. 2022-075277 filed on Apr. 28, 2022, the entire contents of which are herein incorporated by reference.

TECHNICAL FIELD

The present disclosure relates to a wireless power transfer system.

BACKGROUND

In a wireless power transfer system that wirelessly transfers power from a power transmitter coil to a power receiver coil, when intensity of a leakage magnetic field not being interlinked with the power receiver coil among magnetic fields generated by the power transmitter coil gets higher, power transmission efficiency is reduced. In addition, when the leakage magnetic field spreads widely, the leakage magnetic field may influence the ambient environment. In the past, various techniques have been proposed to reduce the leakage magnetic field.

For example, as disclosed in JP2015-47046A1, a wireless power transfer system has been publicly known, in which solenoid coils that generate magnetic fluxes oriented oppositely to each other are arranged in parallel in a direction that intersects winding axis directions of the solenoid coils. In this wireless power transfer system, a power transmitter coil includes a first unit coil and a second unit coil arranged spaced apart from each other on a first face in a first direction, each coil being configured in such a way that currents flowing through them are in opposite phases while a power receiver coil includes a third unit coil and a fourth unit coil arranged spaced apart from each other on a second face that is parallel to the first face in the first direction, each coil being configured in such a way that currents flowing through them are in opposite phases. In addition, the winding axes of the first and second unit coils are oriented in parallel along a direction that intersects the first direction on the first face while the winding axes of the third and fourth unit coils are oriented in parallel along a direction that intersects the first direction on the second face. The distance between the first unit coil and the second unit coil is longer than the distance between the first unit coil and the third unit coil, and the distance between the third unit coil and the fourth unit coil is longer than the distance between the second unit coil and the fourth unit coil.

In the wireless power transfer system disclosed in JP2015-47046A1, it is necessary to configure the distance between the first unit coil and the second unit coil and the distance between the third unit coil and the fourth unit coil to be longer than the distance between the first unit coil and the third unit coil and the distance between the second unit coil and the fourth unit coil, respectively. In other words, distances between coils of a pair of coils included in each of the power transmitter coil and the power receiver coil need to be longer than the distance between the power transmitter coil and the power receiver coil, thereby causing the physical sizes of the power transmitter coil and the power receiver coil to be increased. On the other hand, when the distances between the coils of the pair of coils included in each of the power transmitter coil and the power receiver coil are configured to be shorter than the distance between the power transmitter coil and the power receiver coil, thereby avoiding an increase in the physical sizes of the power transmitter coil and the power receiver coil, the oppositely oriented magnetic fluxes generated by the pair of coils will interfere with each other and cause the interlinkage magnetic fluxes that are interlinked with the power receiver coil to be reduced, thereby reducing the coupling coefficient between the power transmitter coil and the power receiver coil and eventually reducing the power transmission efficiency.

Therefore, a wireless power transfer system has been in demand, in which an increase in the physical sizes of the power transmitter coil and the power receiver coil is avoided and the leakage magnetic field can be successfully reduced at the same time.

SUMMARY

A summary of the present disclosure is as follows:

(1) A wireless power transfer system that wirelessly transfers power from a power transmitter coil to a power receiver coil, wherein the power transmitter coil and the power receiver coil each include a coil unit, the coil unit being a pair of coils arranged side by side in a horizontal direction, wherein each of the coils in the coil unit has a shape formed by being wound in a horizontal plane and those coils are configured in such a way that magnetic fields generated by currents are oriented oppositely to each other, wherein a connecting portion configured to connect the coils in the coil unit is provided on outside diameter sides of adjacent longer sides of the pair of coils, the longer sides being opposed to each other, and wherein the coils are bent and wound to be substantially point-symmetric about a substantially central point of the connecting portion as a point of symmetry in such a way that coil widths of all longer sides of the pair of coils are substantially equal.

(2) The wireless power transfer system according to above (1), wherein the power transmitter coil and the power receiver coil each include a core unit, the core unit being a pair of cores each configured to induce a magnetic field generated by each coil in the coil unit, and wherein each of the cores in the core unit is integrated with each coil in the coil unit and the cores are arranged spaced apart from each other.

BRIEF DESCRIPTION OF DRAWINGS

FIG. 7A is a plan view illustrating a configuration of a power transmitter coil C111 of a wireless power transfer system, which is target 1 for comparison.

FIG. 7B is a side view illustrating a configuration of a power transmitter coil C111 of a wireless power transfer system, which is target 1 for comparison.

FIG. 7C is a perspective view illustrating a configuration of a power transmitter coil C111 of a wireless power transfer system, which is target 1 for comparison.

FIG. 9B is a diagram illustrating distributions of magnetic flux densities in the X direction (the direction of travel of a vehicle) inside a core of the power transmitter coil C111 of target 1 for comparison when power of 30 kW is transmitted.

FIG. 9C is a diagram illustrating distributions of magnetic flux densities in the X direction (the direction of travel of a vehicle) inside a core of a power transmitter coil 111 according to the present embodiment of the present disclosure when power of 30 kW is transmitted.

FIG. 16A is a diagram illustrating legend of magnetic flux density in Y direction for FIGS. 16B and 16C.

FIG. 16B is a diagram illustrating distributions of magnetic flux densities in the Y direction (vehicle width direction) inside a core of the power transmitter coil C311 of target 2 for comparison when power of 30 kW is transmitted.

FIG. 16C is a diagram illustrating distributions of magnetic flux densities in the Y direction (vehicle width direction) inside a core of the power transmitter coil 111 according to the present embodiment of the present disclosure when power of 30 kW is transmitted.

DETAILED DESCRIPTION

With reference to the drawings, a wireless power transfer system will be described below. In embodiments to be described below, when the numbers, quantities, amounts, or ranges of respective elements are mentioned, the present disclosure is not limited to such mentioned numbers, quantities, amounts, or ranges unless they are expressly specified or obviously identified according to a principle. In addition, configurations described in the embodiments to be described below are not indispensable to the present disclosure unless they are expressly specified or obviously identified according to a principle. In each drawing, like members are denoted by like reference signs. To facilitate understanding, these drawings use different scales as appropriate. The illustrated embodiments are examples for implementing the present disclosure, and the present disclosure is not limited to these embodiments.

1. Configuration

1-1. Circuit Configuration

Figure 1:
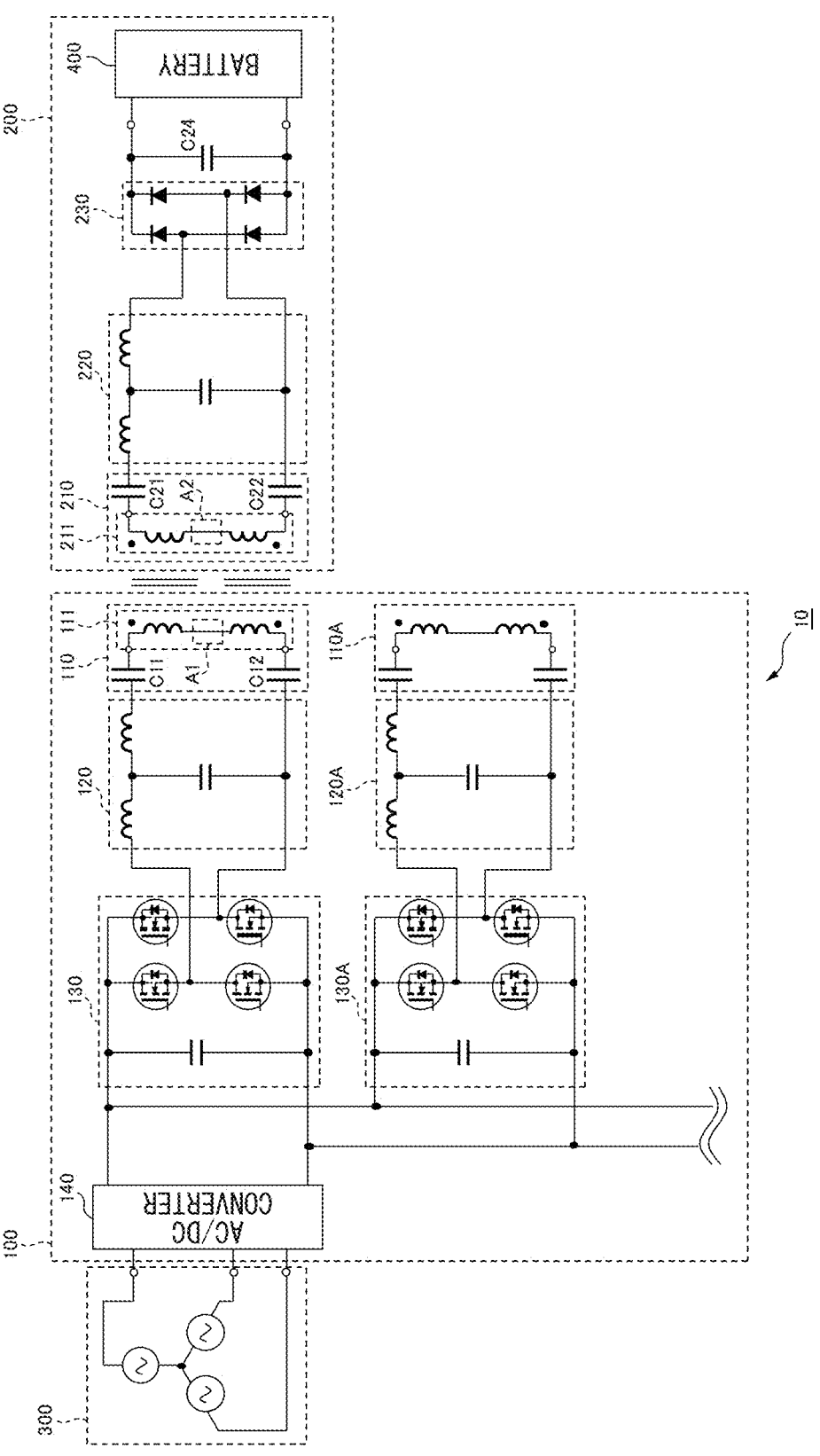
FIG. 1 is a circuit diagram illustrating a circuit configuration of a wireless power transfer system 10 according to an embodiment of the present disclosure.

FIG. 1 is a circuit diagram illustrating a circuit configuration of a wireless power transfer system 10 according to an embodiment of the present disclosure. The wireless power transfer system 10 according to the present embodiment of the present disclosure includes a power transmitter device 100, a power receiver device 200, a power supply 300, and a battery 400.

The power transmitter device 100 and the power supply 300 are typically fixedly mounted on the ground, on a road surface, or on a floor. The power receiver device 200 and the battery 400 are typically installed in a movable object (a vehicle, a smartphone, or the like), which is a subject for charging.

The wireless power transfer system 10 according to the present embodiment of the present disclosure transfers power, as magnetic resonance occurs between a power transmitter coil 111 included in the power transmitter device 100 and a power receiver coil 211 included in the power receiver device 200, from the power transmitter coil 111 to the power receiver coil 211. In other words, power is transferred by the magnetic resonance method. Power supplied by the power supply 300 to the power transmitter device 100 is thus transferred to the power receiver device 200, and the power receiver device 200 charges the battery 400.

Note that, although FIG. 1 illustrates a single power receiver device 200 and a single battery 400, when there are a plurality of movable objects, which are subjects for charging, the power receiver device 200 and the battery 400 illustrated in FIG. 1 are installed on each movable object. The plurality of movable objects may receive power from the same power transmitter device 100 and charge the battery 400 thereof.

The power supply 300 is connected with the power transmitter device 100 and supplies power to the power transmitter device 100. The power supply 300 is a three-phase AC power supply. For example, the power supply 300 is a system power supply with 200V phase voltage. Note that the power supply 300 may be a single-phase AC power supply.

The battery 400 is connected with the power receiver device 200, and charged by the power receiver device 200. The battery 400 is typically a rechargeable DC power supply such as a lithium-ion battery or a nickel hydride battery.

The power transmitter device 100 includes a power transmitter circuit 110, an immittance filter 120, an inverter 130, and an AC/DC converter 140. Each of the power transmitter circuit 110, the immittance filter 120, the inverter 130, and the AC/DC converter 140 are configured to be connected by a cascade connection.

The AC/DC converter 140 rectifies and transforms AC power supplied by the power supply 300, and outputs the resultant DC power to the inverter 130. The AC/DC converter 140 is typically constructed from a rectifier circuit including diodes and capacitors and a buck-boost circuit including a semiconductor switching device (such as an IGBT or a MOSFET). With the semiconductor switching device controlled by a controller (not illustrated), the AC/DC converter 140 is controlled with respect to the output voltage thereof and activating/deactivating. The controller includes one or more CPUs (Central Processing Units) and a peripheral circuit thereof. The controller may further include an arithmetic circuit such as a logical operation unit or an arithmetic logical unit. The controller performs various processes in accordance with a software program.

The inverter 130 converts a DC power output from the AC/DC converter 140 into an AC power of a predetermined frequency and outputs the resultant AC power via the immittance filter 120 to the power transmitter circuit 110. The inverter 130 performs conversion of DC power in such a way that the frequency of the output AC power is equal to the resonance frequency of the power transmitter circuit 110 to be described later. The frequency of the AC power output by the inverter 130 (i.e., the resonance frequency of the power transmitter circuit 110) is, for example, a high frequency as high as 85 kHz.

The inverter 130 is typically constructed from a single-phase full-bridge circuit including a semiconductor switching device. As switching control is performed on the inverter 130 by a controller (not illustrated) by the pulse width modulation (PWM) method, the inverter 130 converts a DC power into an AC power of a predetermined frequency. The inverter 130 is also controlled by the controller with respect to activating/deactivating.

The immittance filter 120 reduces an electromagnetic noise in the output power from the inverter 130. The immittance filter 120 is constructed from a coil and a capacitor as illustrated in FIG. 1 and functions as a low-pass filter to regulate impedance of the power transmitter device 100.

The power transmitter circuit 110 is a resonant circuit constructed from the power transmitter coil 111 and capacitors C11 and C12. Coils L11 and L12 in the power transmitter coil 111 are respectively connected with the capacitors C11 and C12 at one end thereof. The capacitor C11, the coil L11, the coil L12, and the capacitor C12 are connected in series in this order, and the power transmitter circuit 110 is a series resonant circuit. The capacitors C11 and C12 are resonant capacitors that provide capacitance to the resonant circuit (power transmitter circuit 110). The capacitances of the capacitors C11 and C12 are approximately equal. Details of the power transmitter circuit 110 and the power transmitter coil 111 will be described later.

The resonance frequency of the power transmitter circuit 110 is equal to the frequency of the output power from the inverter 130. The power transmitter coil 111 magnetically resonates with the power receiver coil 211 to be described later due to the power output from the inverter 130 at the resonance frequency. As a result, power is transmitted from the power transmitter coil 111 to the power receiver coil 211.

When power is transferred to a moving movable object, a plurality of power transmitter coils 111 (consequently, the power transmitter circuit 110) are arranged along a route traveled by the movable object. For example, when power is transferred to a traveling vehicle, a plurality of power transmitter coils 111 are arranged on a road along a route traveled by the vehicle. In this case, it is desired to properly switch power transmitter coils 111 for transmitting power according to the travel of the movable object. Therefore, in addition to the power transmitter circuit 110, a plurality of immittance filters 120 and a plurality of inverters 130 are arranged along the route of travel. In contrast, more than one AC/DC converter 140 is not necessary to be arranged as long as DC power output from the AC/DC converter 140 is supplied to each of the inverters 130.

To indicate this, FIG. 1 illustrates a case where the power transmitter device 100 includes a plurality of power transmitter circuits 110, a plurality of immittance filters 120, and a plurality of inverters 130. As illustrated in FIG. 1, a plurality of circuits in which the power transmitter circuits 110, the immittance filters 120, and the inverters 130 are connected by a cascade connection are connected with the AC/DC converter 140 in parallel at the output ends of the AC/DC converter 140. The power transmitter circuits 110, the immittance filters 120, and the inverters 130 here are equivalent to those described above. To distinguish each one of the power transmitter circuits 110, the immittance filters 120, and the inverters 130, a symbol (A, B, or the like) is attached to each reference sign. Note that the power transmitter device 100 according to the present embodiment may be constructed from a single power transmitter circuit 110, a single immittance filter 120, and a single inverter 130.

The power receiver device 200 includes a power receiver circuit 210, an immittance filter 220, a rectifier circuit 230, and a smoothing capacitor C24. Each of the power receiver circuit 210, the immittance filter 220, and the rectifier circuit 230 is configured to be connected by a cascade connection. The smoothing capacitor C24 is connected to output ends of the rectifier circuit.

The power receiver circuit 210 is a resonant circuit constructed from the power receiver coil 211 and capacitors C21 and C22. Coils L21 and L22 in the power receiver coil 211 are respectively connected with the capacitors C21 and C22 at one end thereof. The capacitor C21, the coil L21, the coil L22, and the capacitor C22 are connected in series in this order, and the power receiver circuit 210 is a series resonant circuit. The capacitors C21 and C22 are resonant capacitors that provide capacitance to the resonant circuit (power receiver circuit 210). The capacitances of the capacitors C21 and C22 are approximately equal. Details of the power receiver circuit 210 and the power receiver coil 211 will be described later.

The resonance frequency of the power receiver circuit 210 is equal to the frequency (the resonance frequency of the power transmitter circuit 110) of the output power from the inverter 130. The power receiver coil 211 magnetically resonates with the power transmitter coil 111 and receives power transmitted from the power transmitter coil 111.

The immittance filter 220 reduces an electromagnetic noise in the power received by the power receiver circuit 210. The immittance filter 220 is constructed from a coil and a capacitor as illustrated in FIG. 1 and functions as a low-pass filter to regulate impedance of the power receiver device 200.

The rectifier circuit 230 converts power received by the power receiver circuit 210 into DC power and outputs the resultant DC power. The rectifier circuit 230 is typically a single-phase full-wave rectifier circuit.

The smoothing capacitor C24 smooths the DC power output by the rectifier circuit 230. The DC power smoothed by the smoothing capacitor C24 will be the charging power of the battery 400.

Figures 2A, 2B, 2C:
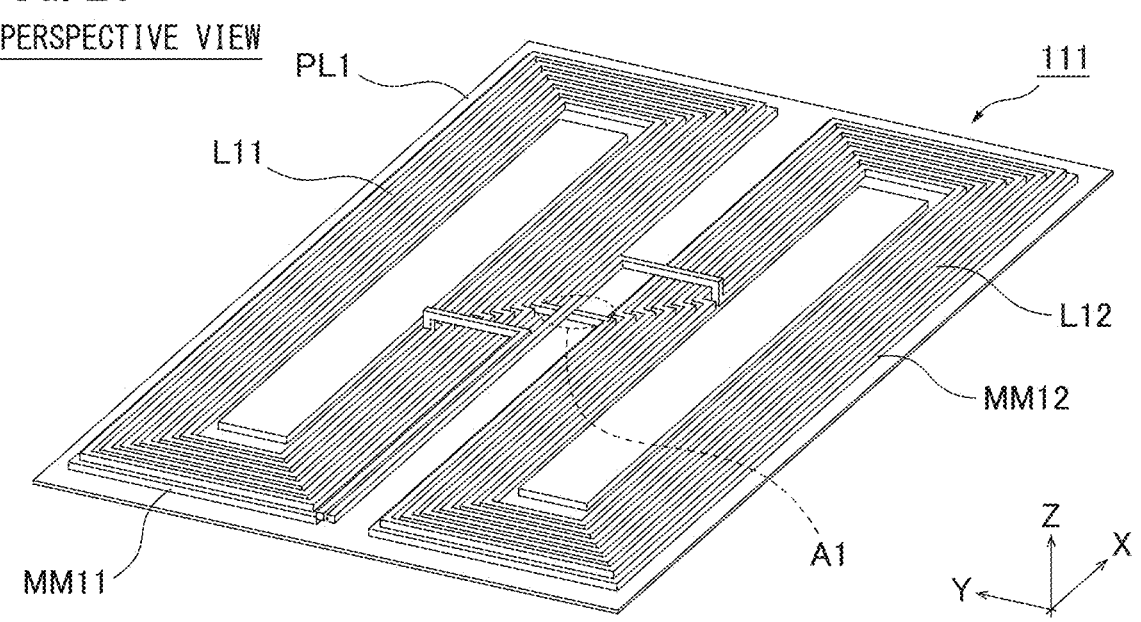
FIG. 2A is a plan view viewed from a vertical direction (Z-axis direction) for explaining a configuration of a power transmitter circuit 110 according to the present embodiment of the present disclosure.
FIG. 2B is a side view viewed from a longitudinal direction (X-axis direction) on the horizontal plane for explaining a configuration of a power transmitter circuit 110 according to the present embodiment of the present disclosure.
FIG. 2C is a perspective view for explaining a configuration of a power transmitter circuit 110 according to the present embodiment of the present disclosure.

1-2. Power Transmitter Circuit and Power Receiver Circuit
1-2-1. Power Transmitter Circuit FIGS. 2A, 2B and 2C are conceptual diagrams for explaining a configuration of the power transmitter circuit 110 according to the present embodiment of the present disclosure. With respect to the power transmitter circuit 110 positioned on a horizontal plane (X-Y plane), FIG. 2A is a plan view viewed from a vertical direction (Z-axis direction), FIG. 2B is a side view viewed from a longitudinal direction (X-axis direction) on the horizontal plane, and FIG. 2C is a perspective view. The power transmitter circuit 110 is a resonant circuit constructed from the power transmitter coil 111 and the capacitors C11 and C12 as described above.

The power transmitter coil 111 includes a first coil unit being a pair of coils (coils L11 and L12), a first core unit being a pair of cores (cores MM11 and MM12), and an aluminum plate PL1. The coils L11 and L12 and the cores MM11 and MM12 are held by a plastic component or the like (not illustrated).

Each of the coils L11 and L12 in the first coil unit has, as illustrated in FIGS. 2A, 2B and 2C, a circular shape formed by being wound in the horizontal plane (X-Y plane). The coils L11 and L12 are connected to each other at one end thereof by a connecting portion A1, and they are wound in such a way that the magnetic fields generated by currents are oriented oppositely to each other. In other words, the coil L11 generates, for example, an upward magnetic field with respect to the vertical direction (Z-axis direction) while the coil L12 generates, for example, a downward magnetic field with respect to the vertical direction (Z-axis direction).

Each of the coils L11 and L12 in the first coil unit has two longer sides (in FIGS. 2A, 2B and 2C, the sides of the coil along the X-axis direction, which is a major axis direction) and two shorter sides (in FIGS. 2A, 2B and 2C, the sides of the coil along the Y-axis direction, which is a minor axis direction). The coils L11 and L12 in the first coil unit are connected to each other by the connecting portion A1 at points in outside diameter portions of the opposing longer sides of the coils L11 and L12. In other words, the connecting portion A1 is provided on outside diameter sides of the adjacent longer sides of the pair of coils L11 and L12, the longer sides being opposed to each other (in an area between the coils L11 and L12).

As the shorter sides of the coils L11 and L12 in the first coil unit generate magnetic fields in the X direction, if the connecting portion is provided on the side of the shorter sides of the coils, the magnetic fields in the X direction generated by the coils L11 and L12 become imbalanced and a distant leakage magnetic field will be strengthened. Therefore, the present embodiment of the present disclosure employs a configuration in which the connecting portion A1 configured to connect the coils L11 and L12 is provided on the side of the longer sides of the coils rather than the side of the shorter sides of the coils. In this way, the magnetic fields in the X direction generated by the shorter sides of the coils on the sides on which the connecting portion A1 is not provided will be equal in intensity and oppositely oriented for coils L11 and L12; thus, increase in intensity of the distant leakage magnetic field in the X direction can be successfully reduced.

When employing a configuration in which the connecting portion A1 is provided on the side of the longer sides of the pair of coils L11 and L12, to make coil widths of the opposing longer sides of the coils (WI11 and WI12) to be substantially equal to those of the longer sides of the coils that are not opposed (WO11 and WO12), in other words, to make coil widths of all longer sides of the pair of coils L11 and L12 to be substantially equal (WO11=WI11=WI12=WO12), portions of the longer sides of the coils near the connecting portion A1 are appropriately bent in such a way that the coils L11 and L12 are substantially point-symmetric about a substantially central point of the connecting portion A1 as a point of symmetry (symmetric point). In this way, the magnetic fields in the Y direction generated by the longer sides of the coils L11 and L12 will be equal in intensity and oppositely oriented for coils L11 and L12; thus, increase in intensity of the distant leakage magnetic field in the Y direction can be successfully reduced.

The cores MM11 and MM12 in the first core unit are made of a magnetic material and respectively induce magnetic fields generated by the coils L11 and L12 in the first coil unit. The cores MM11 and MM12 are typically composed of ferrite.

The cores MM11 and MM12 in the first core unit are respectively integrated with the coils L11 and L12 in the first coil unit, and the cores are arranged side by side with a distance AW1 (referred to as a "first inter-core distance AW1") apart in the horizontal direction (Y-axis direction).

The aluminum plate PL1 is disposed under the coils L11 and L12 and the cores MM11 and MM12, and reduces an effect of an external magnetic field on the power transmitter circuit 110.

1-2-2 Power Receiver Circuit

Figure 3A:
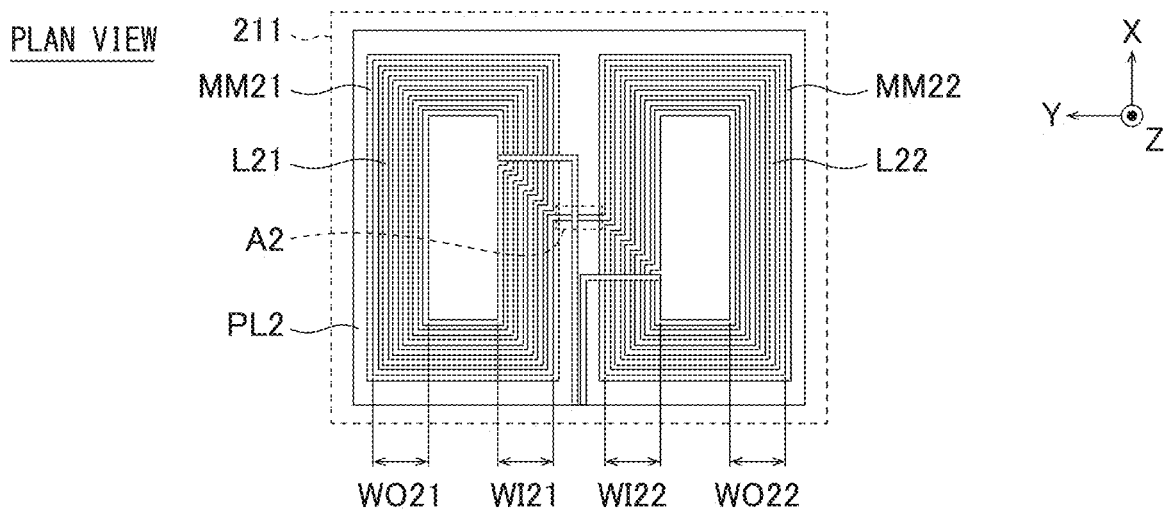
FIG. 3A is a plan view viewed from a vertical direction (Z-axis direction) for explaining a configuration of a power receiver circuit 210 according to the present embodiment of the present disclosure.
Figure 3B:
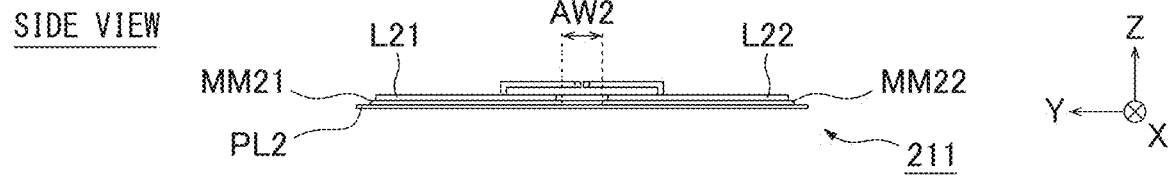
FIG. 3B is a side view viewed from a longitudinal direction (X-axis direction) on the horizontal plane for explaining a configuration of a power receiver circuit 210 according to the present embodiment of the present disclosure.
Figure 3C:
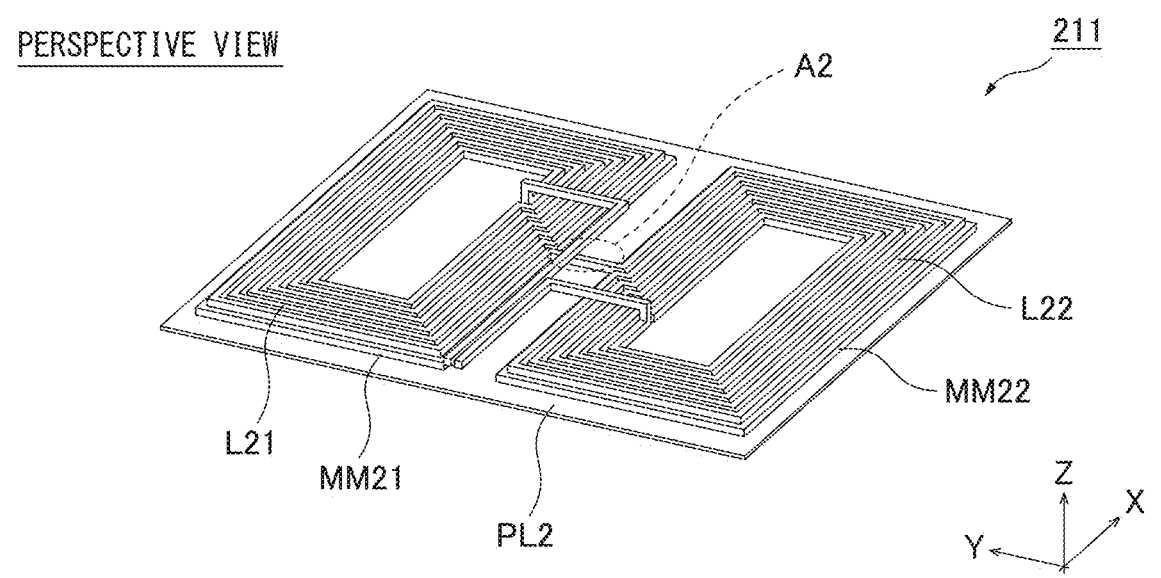
FIG. 3C is a perspective view for explaining a configuration of a power receiver circuit 210 according to the present embodiment of the present disclosure.

FIGS. 3A, 3B 3C are conceptual diagrams for explaining a configuration of the power receiver circuit 210 according to the present embodiment of the present disclosure. With respect to the power receiver circuit 210 positioned on a horizontal plane (X-Y plane), FIG. 3A is a plan view viewed from a vertical direction (Z-axis direction), FIG. 3B is a side view viewed from a longitudinal direction (X-axis direction) on the horizontal plane, and FIG. 3C is a perspective view. The power receiver circuit 210 is a resonant circuit constructed from the power receiver coil 211 and the capacitors C21 and C22 as described earlier.

The power receiver coil 211 includes a second coil unit being a pair of coils (coils L21 and L22), a second core unit being a pair of cores (cores MM21 and MM22), and an aluminum plate PL2. The coils L21 and L22 and the cores MM21 and MM22 are held by a plastic component or the like (not illustrated).

Each of the coils L21 and L22 in the second coil unit has, as illustrated in FIGS. 3A, 3B and 3C, a circular shape formed by being wound in the horizontal plane (X-Y plane). The coils L21 and L22 are connected to each other at one end thereof by a connecting portion A2, and they are wound in such a way that the magnetic fields generated by currents are oriented oppositely to each other. In this way, the coils L21 and L22 in the second coil unit can respectively properly receive magnetic fields generated by the coils L11 and L12 in the first coil unit, which are oriented oppositely to each other.

Each of the coils L21 and L22 in the second coil unit has two longer sides (in FIGS. 3A, 3B and 3C, the sides of the coil along the X-axis direction, which is a major axis direction) and two shorter sides (in FIGS. 3A, 3B and 3C, the sides of the coil along the Y-axis direction, which is a minor axis direction). In some embodiments, the coils L21 and L22 in the second coil unit are connected to each other by the connecting portion A2 at points in outside diameter portions of the opposing longer sides of the coils L21 and L22. In other words, the connecting portion A2 is provided on outside diameter sides of the adjacent longer sides of the pair of coils L21 and L22, the longer sides being opposed to each other (in an area between the coils L21 and L22).

As the shorter sides of the coils L11 and L22 in the second coil unit generate magnetic fields in the X direction, if the connecting portion is provided on the side of the shorter sides of the coils, the magnetic fields in the X direction received by the coils L21 and L22 become imbalanced and a distant leakage magnetic field will be strengthened. Therefore, the present embodiment of the present disclosure employs a configuration in which the connecting portion A2 configured to connect the coils L21 and L22 is provided on the side of the longer sides of the coils rather than the side of the shorter sides of the coils. In this way, the magnetic fields in the X direction received by the shorter sides of the coils on the sides on which the connecting portion A2 is not provided will be equal in intensity and oppositely oriented for coils L21 and L22; thus, increase in intensity of the distant leakage magnetic field in the X direction can be successfully reduced.

When employing a configuration in which the connecting portion A2 is provided on the side of the longer sides of the pair of coils L21 and L22, to make coil widths of the opposing longer sides of the coils (WI21 and WI22) to be substantially equal to those of the longer sides of the coils that are not opposed (WO21 and WO22), in other words, to make coil widths of all longer sides of the pair of coils L21 and L22 to be substantially equal (WO21=WI21=WI22=WO22), portions of the longer sides of the coils near the connecting portion A2 are appropriately bent in such a way that the coils L21 and L22 are substantially point-symmetric about a substantially central point of the connecting portion A2 as a point of symmetry (symmetric point). In this way, the magnetic fields in the Y direction at the longer sides of the coils L21 and L22 will be equal in intensity and oppositely oriented for coils L21 and L22; thus, increase in intensity of the distant leakage magnetic field in the Y direction can be successfully reduced.

The first coil unit (coils L11 and L12) of the power transmitter coil 111 and the second coil unit (coils L21 and L22) of the power receiver coil 211 are located to face each other. Therefore, as illustrated in FIGS. 2A, 2B and 2C and FIGS. 3A, 3B and 3C, when the first coil unit (coils L11 and L12) and the second coil unit (coils L21 and L22) of the power receiver coil 211 are located to face each other, the coil winding of the power receiver coil 211 from the coil L21 to the coil L22 via the connecting portion A2 is configured to be similarly routed to that of the power transmitter coil 111 from the coil L11 to the coil L12 via the connecting portion A1. Similarly, as illustrated in FIGS. 2A, 2B and 2C and FIGS. 3A, 3B and 3C, when the first coil unit (coils L11 and L12) and the second coil unit (coils L21 and L22) of the power receiver coil 211 are located to face each other, lead wires of the power receiver coil 211 that run from the second coil unit (coils L21 and L22) to the capacitor C21 and the capacitor C22 are configured to be similarly routed to those of the power transmitter coil 111 that run from the first coil unit (coils L11 and L12) to the capacitor C11 and the capacitor C12. In this way, increase in intensity of the distant leakage magnetic field in the X direction and intensity of the distant leakage magnetic field in the Y direction can be successfully reduced even further.

In addition, the length of the first coil unit in the major axis direction (in FIGS. 2A, 2B and 2C, the X-axis direction) is configured to be longer than the length of the second coil unit in the major axis direction (in FIGS. 3A, 3B and 3C, the X-axis direction). In contrast, the lengths of the first coil unit and the second coil unit in the minor axis direction (in FIGS. 2A, 2B and 2C and FIGS. 3A, 3B and 3C, the Y-axis direction) are configured to be equal. In this way, pulsation of the power received by the power receiver coil 211 can be reduced.

The cores MM21 and MM22 in the second core unit are made of a magnetic material and respectively induce magnetic fields generated by the coils L21 and L22 in the second coil unit. The cores MM21 and MM22 are typically composed of ferrite.

The cores MM21 and MM22 in the second core unit are respectively integrated with the coils L21 and L22 in the second coil unit, and the cores are arranged side by side with a distance AW2 (referred to as a "second inter-core distance AW2") apart in the horizontal direction (Y-axis direction).

To improve transmission efficiency, the second inter-core distance AW2 is desired to be substantially equal to the first inter-core distance AW1. Hereinafter, it is assumed that the first inter-core distance AW1 and the second inter-core distance AW2 are substantially equal.

The aluminum plate PL2 is disposed under the coils L21 and L22 and the cores MM21 and MM22, and reduces an effect of an external magnetic field on the power receiver circuit 210.

1-2-3 Arrangement

Figure 4:
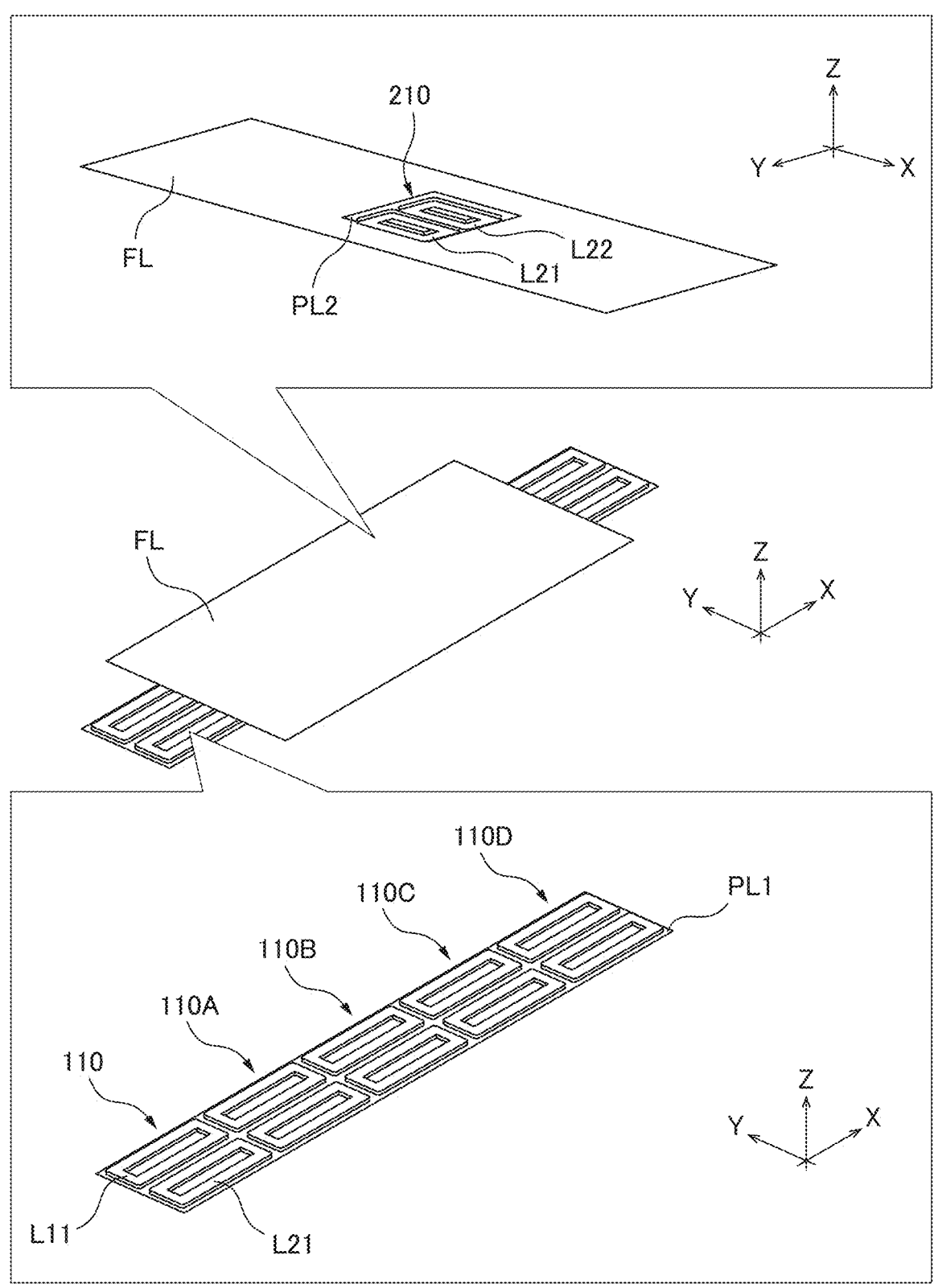
FIG. 4 is a conceptual diagram for explaining arrangement of the power transmitter circuit 110 and the power receiver circuit 210.
Figure 5A:
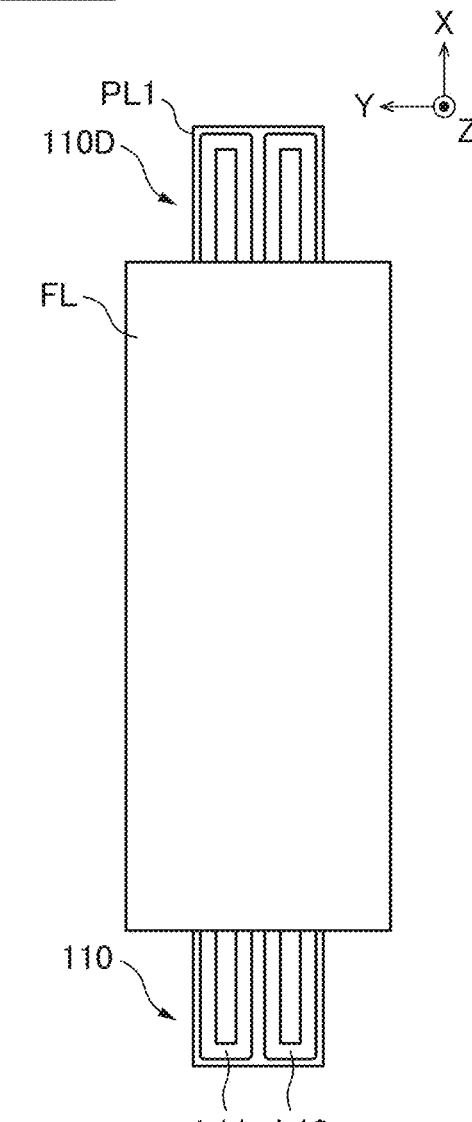
FIG. 5A is a plan view viewed from a vertical direction (Z-axis direction) for explaining arrangement of the power transmitter circuit 110 and the power receiver circuit 210.
Figure 5B:
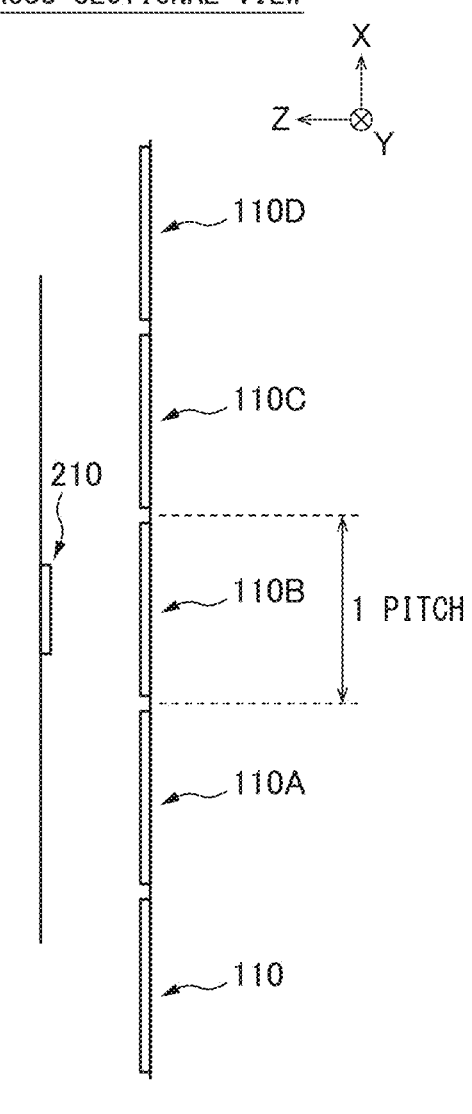
FIG. 5B is a cross-sectional view viewed from a longitudinal direction (X-axis direction) on the horizontal plane for explaining arrangement of the power transmitter circuit 110 and the power receiver circuit 210.
Figure 5C:
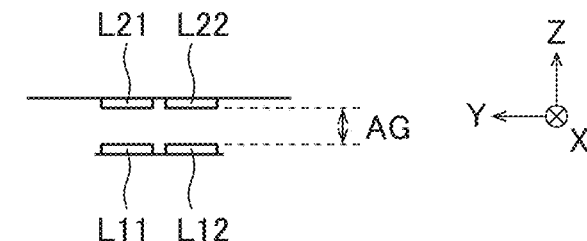
FIG. 5C is cross-sectional view viewed from a lateral direction (Y-axis direction) on the horizontal plane for explaining arrangement of the power transmitter circuit 110 and the power receiver circuit 210.

The first coil unit (coils L11 and L12) and the second coil unit (coils L21 and L22) are located to face each other. FIG. 4 and FIGS. 5A, 5B and 5C are conceptual diagrams for explaining arrangement of the power transmitter circuit 110 and the power receiver circuit 210. In FIG. 4, perspective views are illustrated. FIG. 5A is a plan view viewed from a vertical direction (Z-axis direction), FIG. 5B is a cross-sectional view viewed from a longitudinal direction (X-axis direction) on the horizontal plane, and FIG. 5C is a cross-sectional view viewed from a lateral direction (Y-axis direction) on the horizontal plane. FIG. 4 and FIGS. 5A, 5B and 5C illustrate a case where the power transmitter device 100 includes a plurality of power transmitter circuits 110, and five first coil units are depicted as an example. In other words, FIG. 4 and FIG. 5 illustrate arrangement of the power transmitter circuits 110 when power is transferred to a moving movable object. Note that in FIG. 4 and FIG. 5, the structures of the power transmitter circuit 110 and the power receiver circuit 210 as described in FIGS. 2A, 2B and 2C and FIGS. 3A, 3B and 3C are partially omitted.

As illustrated in FIGS. 5A, 5B and 5C, the first coil unit and the second coil unit face each other with a distance AG (referred to as a "distance AG for transmitting/receiving power") apart in the vertical direction. As illustrated in FIG. 4, the plurality of first coil units are attached in a row to the aluminum plate PL1, which is fixedly mounted, for example, on the ground, a road surface, or a floor. The direction (X-axis direction) in which the first coil units are arranged in a row is typically a traveling direction of the route traveled by the movable object. The second coil unit is attached to the aluminum plate PL2 and installed on the movable object, which is a subject for charging. A face FL indicates a portion of the movable object where the second coil unit is installed. When the movable object is a vehicle, the face FL is, for example, a bottom of a body of the vehicle.

As described above, the length of the plurality of first coil units per pitch is configured to be longer than that of the second coil unit in the major axis direction (X-axis direction). In this way, pulsation of the power received by the power receiver coil 211 per pitch can be reduced.

2. Operation

Figure 6:
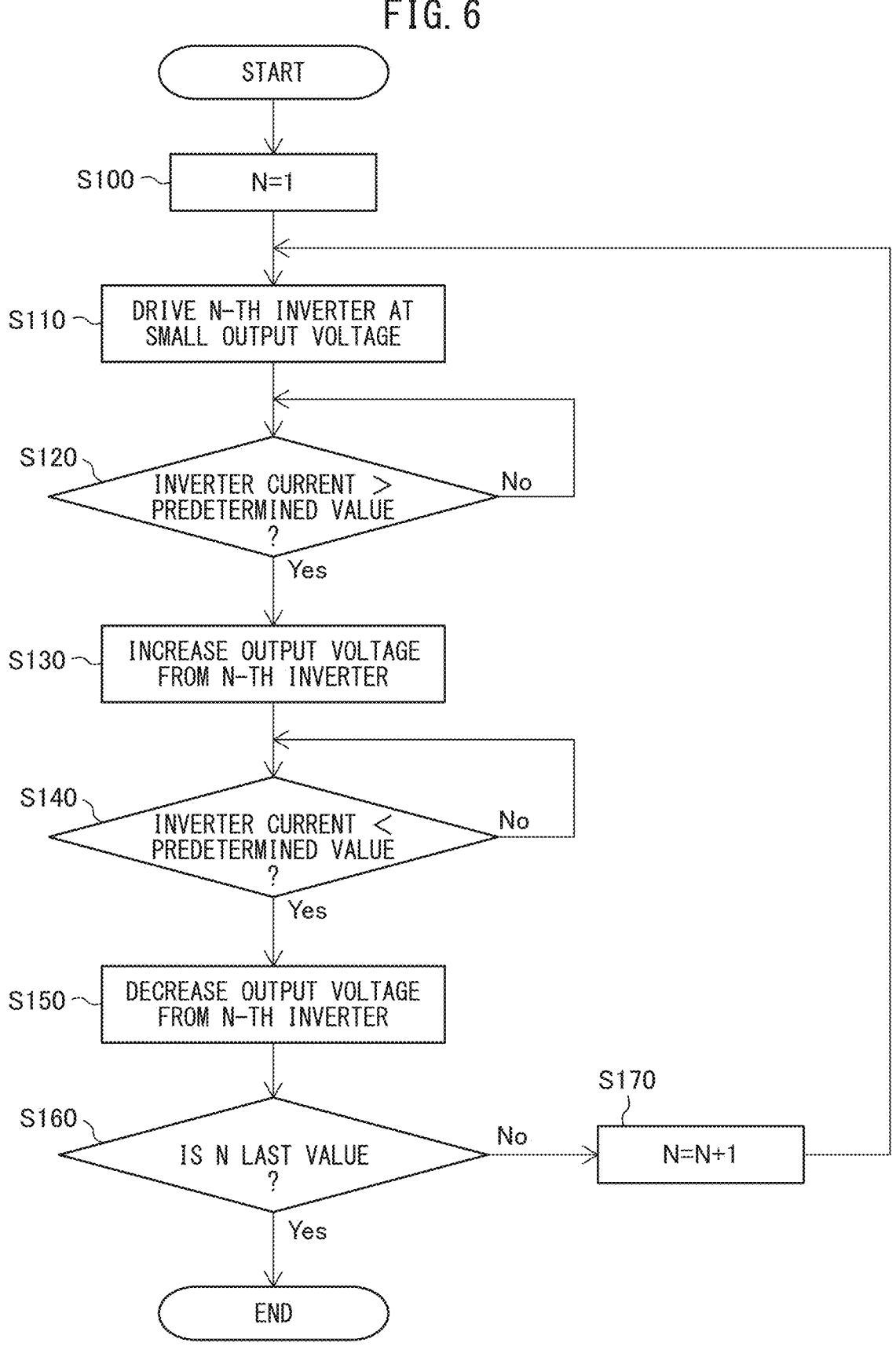
FIG. 6 is a flowchart illustrating an example process of activating and controlling a plurality of inverters 130 of a power transmitter device 100 according to the present embodiment of the present disclosure.

To transfer power to the moving movable object, each of the inverters 130 associated with the plurality of power transmitter coils 111 needs to be properly controlled depending on a position of the movable object. FIG. 6 is a flowchart illustrating an example process of activating and controlling the plurality of inverters 130 of the power transmitter device 100 according to the present embodiment of the present disclosure.

The process illustrated in FIG. 6 is performed by the controller associated with the inverter 130. The process illustrated in FIG. 6 is started when a condition for activating a first one of the inverters 130 is satisfied. The first one of the inverters 130 is the inverter 130 associated with the power transmitter coil 111 that first transmits power to the movable object. It will be, when the movable object is a vehicle and the power transmitter coils 111 are arranged in a row on a road, the inverter 130 associated with the transmitter coil 111 over which the vehicle passes first. The condition for activating the first one of the inverters 130 is, for example, detection of passing a point that exists before the position of the power transmitter coil 111 to be passed over first and before which there is no divergent path until the power transmitter coil 111 is passed over.

In step S100, the controller sets N, which is a value that indicates the inverter 130 to be controlled, to 1. N corresponds to the numbers of the inverters 130 associated with the power transmitter coils 111 arranged in a row, and N=1 indicates the inverter 130 associated with the power transmitter coil 111 that first transmits power to the movable object. After step S100, the process proceeds to step S110.

In step S110, the controller drives the N-th inverter 130 at a small output voltage. Immediately after the process is started, the value of N will be 1 (N=1), and the first one of the inverters 130 is driven at a small output voltage. After step S110, the process proceeds to step S120.

In step S120, the controller determines whether an output current of the N-th inverter 130 (inverter current) exceeds a predetermined value or not. The inverter current has a characteristic that the current increases as the power receiver coil 211 approaches the power transmitter coil 111 and decreases as the power receiver coil 211 moves away farther from the power transmitter coil 111. Therefore, when the movable object passes over the power transmitter coil 111, the inverter current increases until a position at which the movable object is closest to the power transmitter coil 111 and decreases thereafter. In other words, the controller can judge, by detecting the inverter current of the N-th inverter exceeding the predetermined value, that the movable object has sufficiently approached the N-th inverter 130. The predetermined value here is a value provided to a program in advance and the most suitable value based on experiments or the like.

When the inverter current of the N-th inverter exceeds the predetermined value (Yes in step S120), the process proceeds to step S130. When the inverter current of the N-th inverter does not exceed the predetermined value (No in step S120), processing in step S120 is performed again in the next execution cycle.

In step S130, the controller increases the output voltage from the N-th inverter 130. This is done because the movable object is sufficiently close to the N-th inverter 130 and in order to transmit sufficient power from the power transmitter coil 111 associated with the N-th inverter 130. After step S130, the process proceeds to step S140.

In step S140, the controller determines whether the inverter current of the N-th inverter 130 is lower than a predetermined value or not. As described earlier, the controller can judge, by detecting the inverter current of the N-th inverter falling below the predetermined value, that the movable object has moved a certain distance away from the N-th inverter 130. The predetermined value here is a value provided to a program in advance and the most suitable value based on experiments or the like. The predetermined value here may be equal to or different from the predetermined value in step S120.

When the inverter current of the N-th inverter is lower than the predetermined value (Yes in step S140), the process proceeds to step S150. When the inverter current of the N-th inverter is not lower than the predetermined value (No in step S140), processing in step S140 is performed again in the next execution cycle.

In step S150, the controller decreases the output voltage from the N-th inverter 130. This is done because the movable object is at a certain distance away from the N-th inverter 130 and an effect of power transfer by the power transmitter coil 111 associated with the N-th inverter 130 is small. In this case, the N-th inverter 130 may be deactivated to stop power transfer by the power transmitter coil 111 associated with the N-th inverter 130. After step S150, the process proceeds to step S160.

In step S160, the controller determines whether the N-th inverter 130 is the last inverter or not. This is done by providing the number k of the power transmitter coils 111 to be arranged to a program in advance or obtaining the number and determining whether N is k or not. When the N-th inverter 130 is the last inverter (Yes in step S160), the process is terminated. When the N-th inverter 130 is not the last inverter (No in step S160), the process proceeds to step S170.

In step S170, the controller increments N. After step S170, the process returns to step S110 in the next execution cycle and repeats processing.

With the process described above, each of the plurality of inverters 130 can be controlled depending on the position of the movable object. Note that the process illustrated in FIG. 6 is just an example and an appropriate process may be provided depending on an environment where the wireless power transfer system 10 according to the present embodiment of the present disclosure is adapted or the like.

3. Characteristics

In the wireless power transfer system 10 according to the present embodiment of the present disclosure, by configuring the pair of coils included in each of the power transmitter coil 111 and the power receiver coil 211 to have a circular shape formed by being wound in the horizontal plane, providing the connecting portions A1 and A2 each configured to connect the coils in the pair of coils on the outside diameter sides of the adjacent longer sides of the pair of coils, the longer sides being opposed to each other, and bending and winding the coils to be substantially point-symmetric about a substantially central point of the connecting portions A1 and A2 as a point of symmetry in such a way that the coil widths of all longer sides of the pair of coils are substantially equal, the leakage magnetic field can be successfully reduced.

A comparison is described below between the leakage magnetic field in the wireless power transfer system 10 according to the present embodiment of the present disclosure and a leakage magnetic field in a wireless power transfer system in which a pair of coils integrated with a pair of cores are not employed. It is assumed that in the wireless power transfer system 10 according to the present embodiment of the present disclosure, the power transmitter circuits 110 and the power receiver circuit 210 are configured and arranged as illustrated in FIG. 1 to FIG. 5C.

Figure 8A:
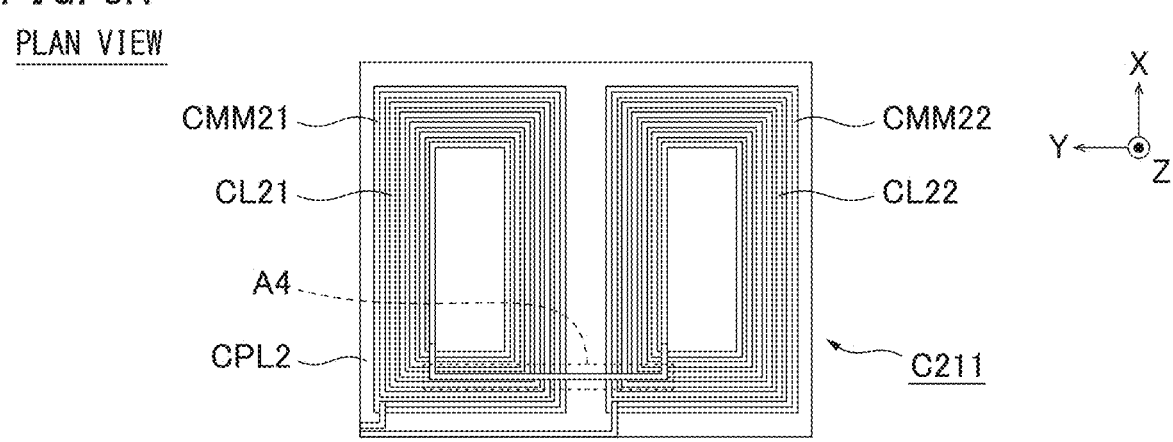
FIG. 8A is a plan view illustrating a configuration of a power receiver coil C211 of the wireless power transfer system of target 1 for comparison.
Figure 8B:
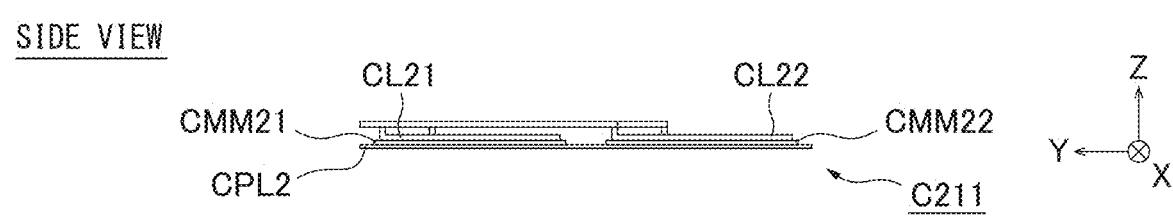
FIG. 8B is a side view illustrating a configuration of a power receiver coil C211 of the wireless power transfer system of target 1 for comparison.
Figure 8C:
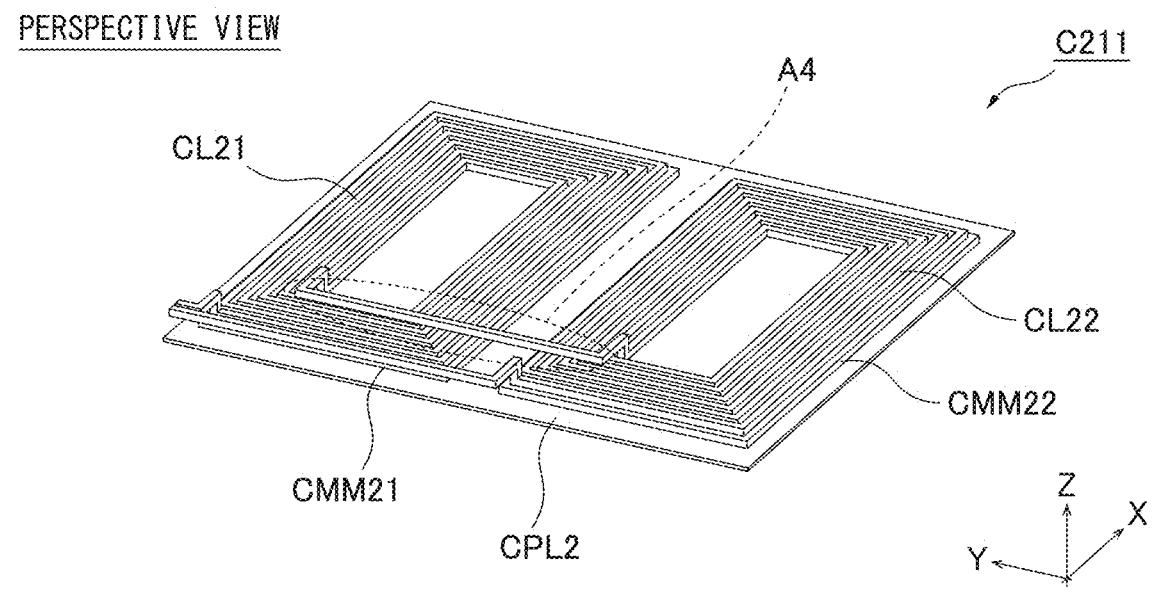
FIG. 8C is a perspective view illustrating a configuration of a power receiver coil C211 of the wireless power transfer system of target 1 for comparison.

FIG. 7A is a plan view illustrating a configuration of a power transmitter coil C111 of a wireless power transfer system, which is target 1 for comparison. FIG. 7B is a side view illustrating a configuration of a power transmitter coil C111 of a wireless power transfer system, which is target 1 for comparison. FIG. 7C is a perspective view illustrating a configuration of a power transmitter coil C111 of a wireless power transfer system, which is target 1 for comparison. FIG. 8A is a plan view illustrating a configuration of a power receiver coil C211 of the wireless power transfer system of target 1 for comparison. FIG. 8B is a side view illustrating a configuration of a power receiver coil C211 of the wireless power transfer system of target 1 for comparison. FIG. 8C is a perspective view illustrating a configuration of a power receiver coil C211 of the wireless power transfer system of target 1 for comparison.

As illustrated in FIGS. 7A, 7B and 7C, the power transmitter coil C111 of the wireless power transfer system of target 1 for comparison includes a first coil unit being a pair of coils (coils CL11 and CL12), a first core unit being a pair of cores (cores CMM11 and CMM12), and an aluminum plate CPL1. The coils CL11 and CL12 each have, as illustrated in FIGS. 7A, 7B and 7C, a circular shape formed by being wound in a horizontal plane (X-Y plane). The coils CL11 and CL12 are wound in such a way that the magnetic fields generated by currents are oriented oppositely to each other. In other words, the coil CL11 generates an upward magnetic field with respect to the vertical direction (Z-axis direction) while the coil CL12 generates a downward magnetic field with respect to the vertical direction (Z-axis direction). The coils CL11 and CL12 in the first coil unit are connected to each other at points in inside diameter portions of the coils CL11 and CL12 by a connecting portion A3.

As illustrated in FIGS. 8A, 8B and 8C, the power receiver coil C211 of the wireless power transfer system of target 1 for comparison includes a second coil unit being a pair of coils (coils CL21 and CL22), a second core unit being a pair of cores (cores CMM21 and CMM22), and an aluminum plate CPL2. The coils CL21 and CL22 each have, as illustrated in FIGS. 8A, 8B and 8C, a circular shape formed by being wound in the horizontal plane (X-Y plane). The coils CL21 and CL22 are wound in such a way that the magnetic fields generated by currents are oriented oppositely to each other. The coils CL21 and CL22 in the second coil unit are connected to each other at points in inside diameter portions of the coils CL21 and CL22 by a connecting portion A4.

Figure 9A:
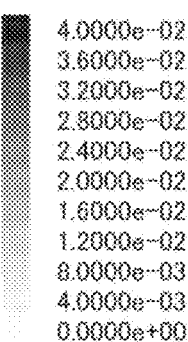
FIG. 9A is a diagram illustrating legend of magnetic flux density in X direction for FIGS. 9B and 9C.
Figure 9A:
Figure 9A:
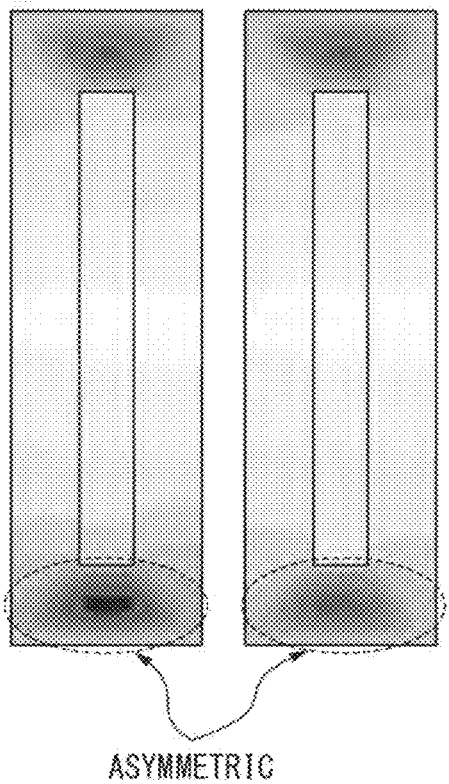
Figure 9A:
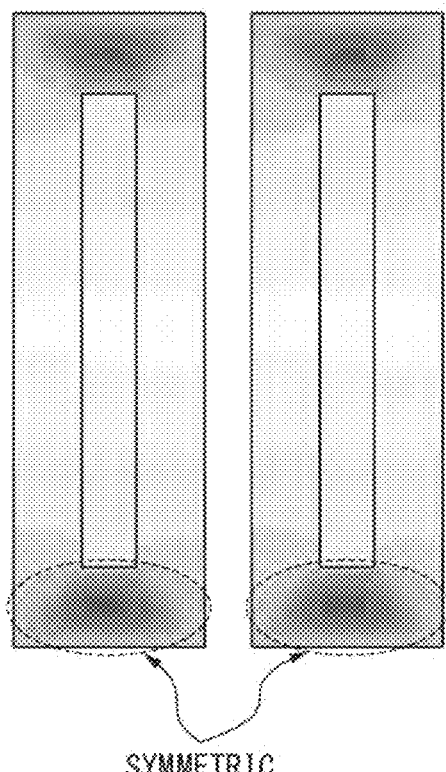

FIG. 9A is a diagram illustrating legend of magnetic flux density in X direction for FIGS. 9B and 9C. FIG. 9B is a diagram illustrating distributions of magnetic flux densities in the X direction (the direction of travel of a vehicle) inside a core of the power transmitter coil C111 of target 1 for comparison when power of 30 kW is transmitted. FIG. 9C is a diagram illustrating distributions of magnetic flux densities in the X direction (the direction of travel of a vehicle) inside a core of the power transmitter coil 111 according to the present embodiment of the present disclosure when power of 30 kW is transmitted. As illustrated in FIGS. 9A, 9B and 9C, in the core of the power transmitter coil C111 of target 1 for comparison, the connecting portion A3 provided on the inside diameter side of the coils CL11 and CL12 causes the magnetic fields in the X direction generated by the pair of coils CL11 and CL12 to be oppositely oriented with different intensities, and the magnetic fields are asymmetric (imbalanced). In contrast, in the core of the power transmitter coil 111 according to the present embodiment of the present disclosure, the magnetic fields in the X direction generated by the pair of coils L11 and L12 are equal in intensity and oppositely oriented, and they are symmetric.

Figure 10:
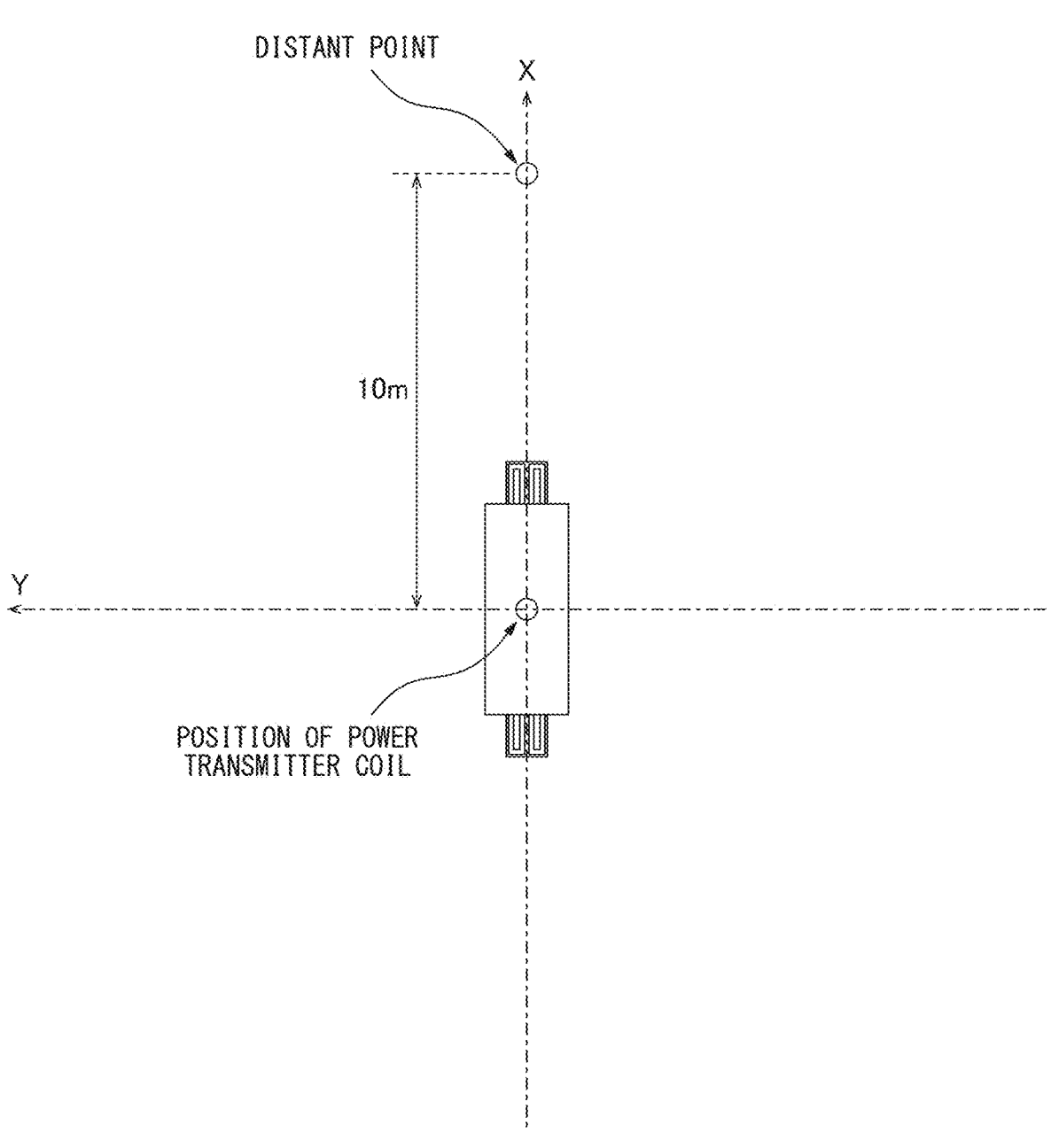
FIG. 10 is a diagram depicting a measurement point for a distant leakage magnetic field in the X direction in the wireless power transfer system.
Figure 11:
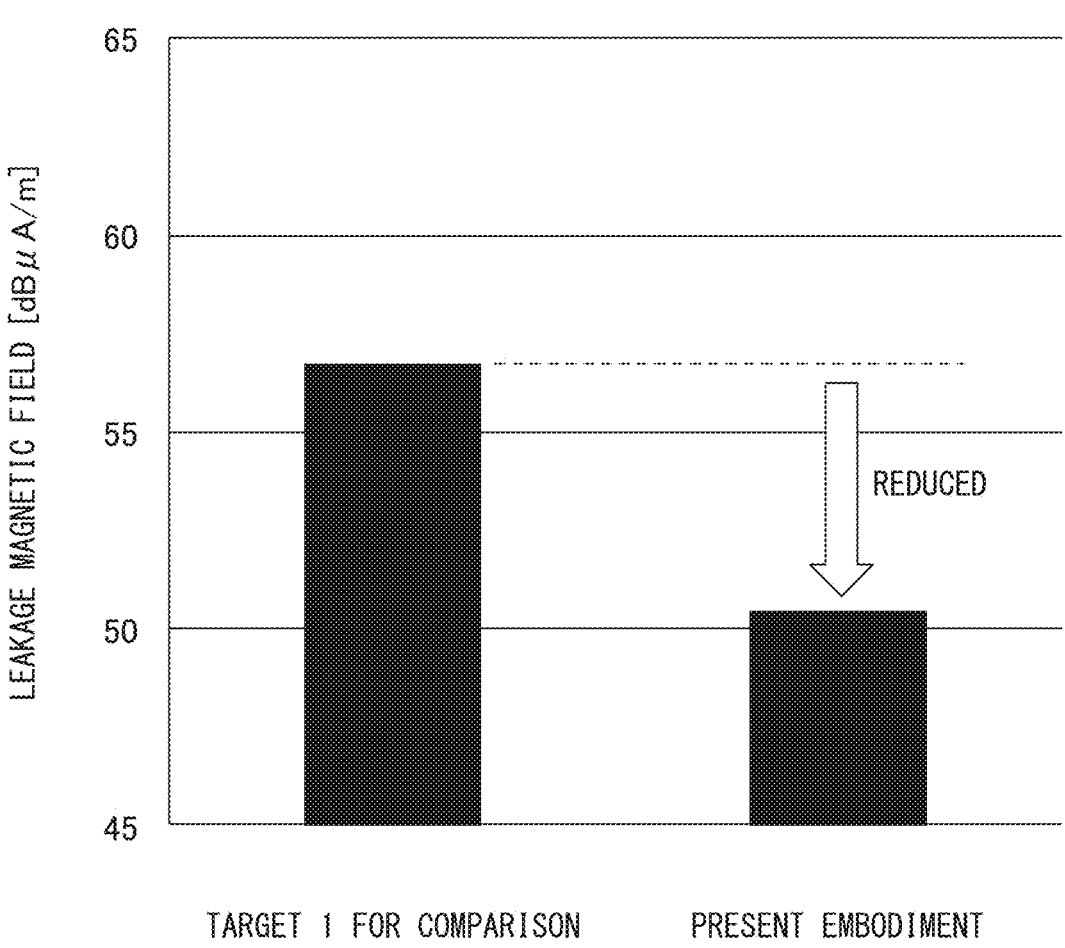
FIG. 11 is a diagram illustrating a comparison result of distant leakage magnetic fields in the X direction at a 10 m point depicted in FIG. 10 in the wireless power transfer system of target 1 for comparison (FIGS. 7A, 7B and 7C and FIGS. 8A, 8B and 8C) and the wireless power transfer system 10 according to the present embodiment of the present disclosure (FIG. 1 to FIG. 5C).

FIG. 10 is a diagram depicting a measurement point for a distant leakage magnetic field in the X direction in the wireless power transfer system. For example, when the movable object that will be the subject for charging is a vehicle and the power transmitter coils (first coil units) are arranged in a row on a road that will be the route traveled by the vehicle, assuming the center of the power transmitter coil as a starting point, a distant point that is about 10 m distant from the starting point in the direction of travel of the vehicle (X-axis direction) is determined as a measurement point for the distant leakage magnetic field in the X direction. FIG. 11 is a diagram illustrating a comparison result of distant leakage magnetic fields in the X direction at the 10 m point depicted in FIG. 10 in the wireless power transfer system of target 1 for comparison (FIGS. 7A, 7B and 7C and FIGS. 8A, 8B and 8C) and the wireless power transfer system 10 according to the present embodiment of the present disclosure (FIG. 1 to FIG. 5C). It is found that, as illustrated in FIG. 11, the wireless power transfer system 10 according to the present embodiment of the present disclosure (FIG. 1 to FIG. 5C) reduces the distant leakage magnetic field by about 7 dB compared to the wireless power transfer system of target 1 for comparison (FIGS. 7A, 7B and 7C and FIGS. 8A, 8B and 8C).

Figure 12A:
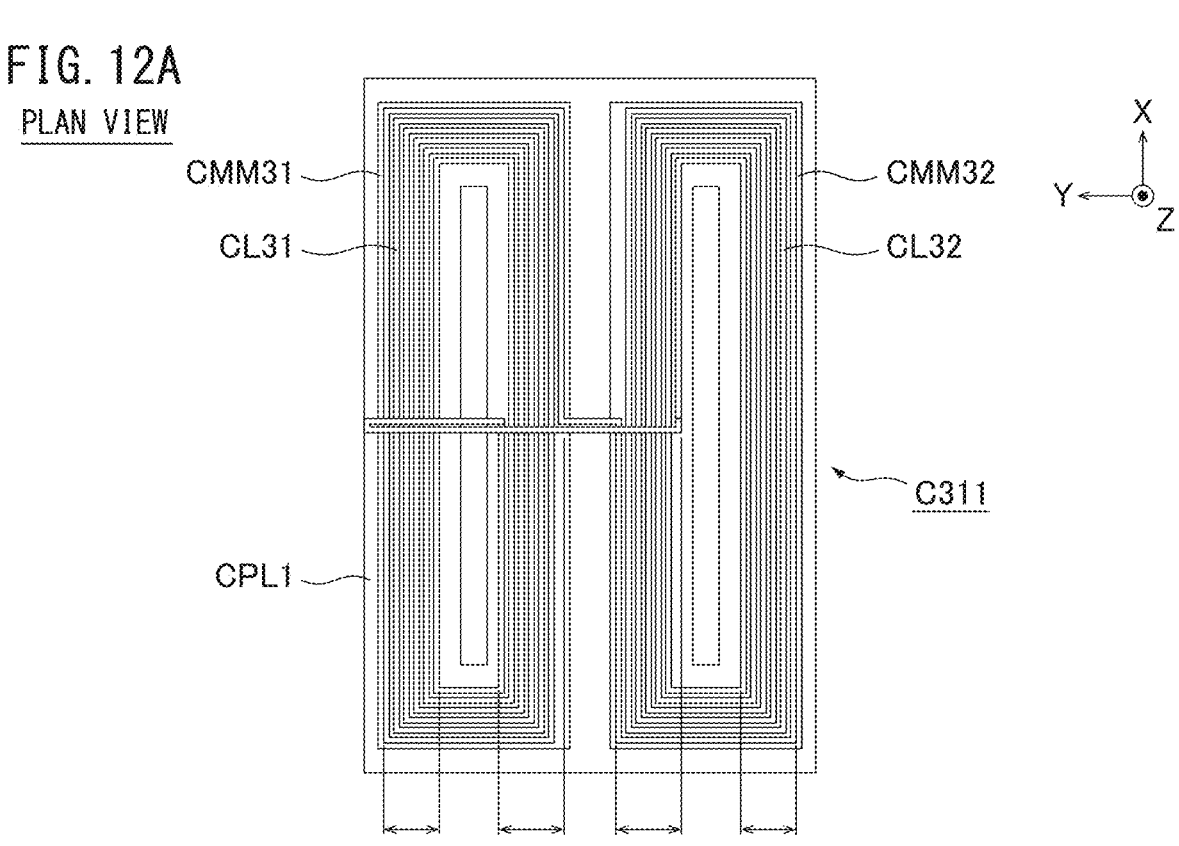
FIG. 12A is a plan view illustrating a configuration of a power transmitter coil C311 of a wireless power transfer system, which is target 2 for comparison.
Figure 12B:
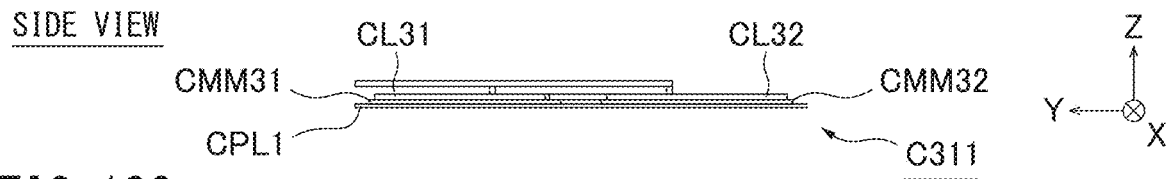
FIG. 12B is a side view illustrating a configuration of a power transmitter coil C311 of a wireless power transfer system, which is target 2 for comparison.
Figure 12C:
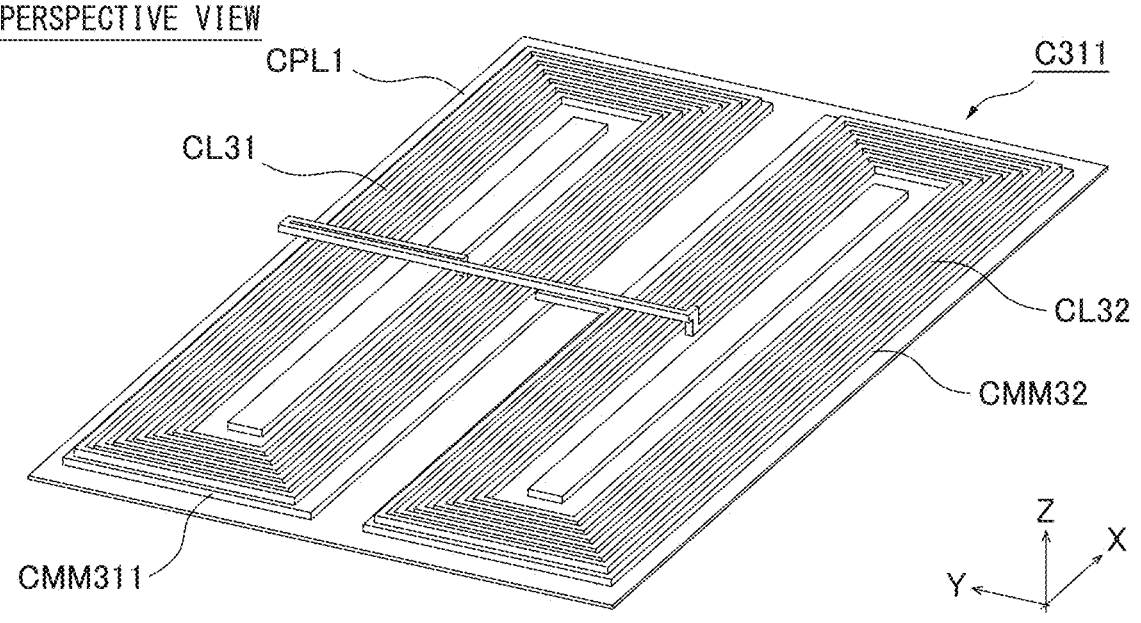
FIG. 12C is a perspective view illustrating a configuration of a power transmitter coil C311 of a wireless power transfer system, which is target 2 for comparison.
Figure 13A:
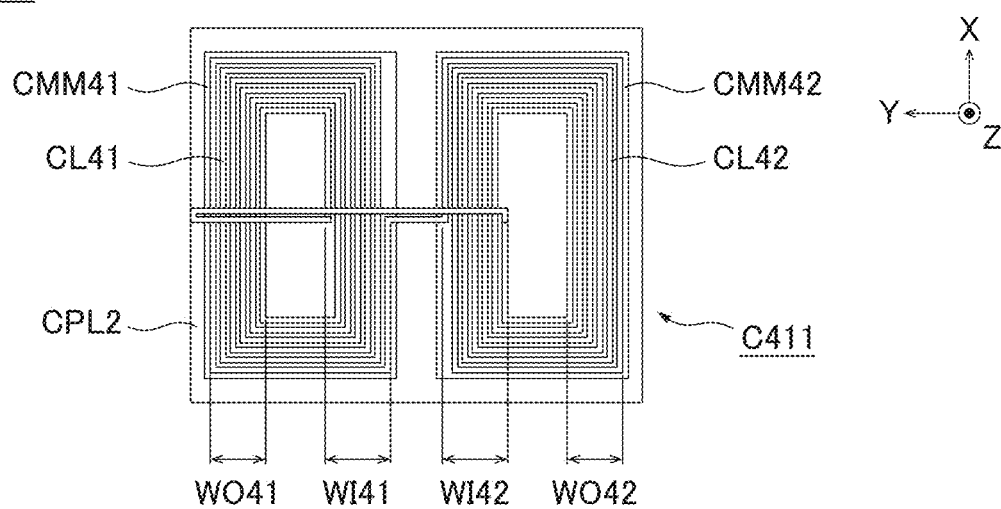
FIG. 13A is a plan view illustrating a configuration of a power receiver coil C411 of the wireless power transfer system of target 2 for comparison.
Figure 13B:
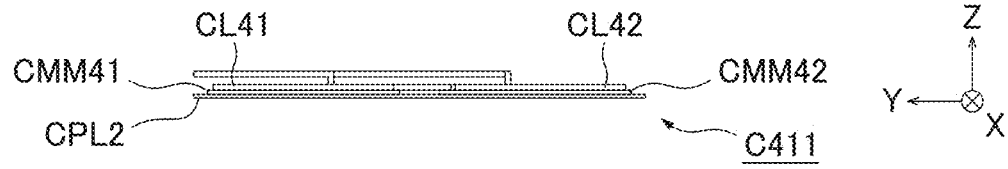
FIG. 13B is a side view illustrating a configuration of a power receiver coil C411 of the wireless power transfer system of target 2 for comparison.
Figure 13C:
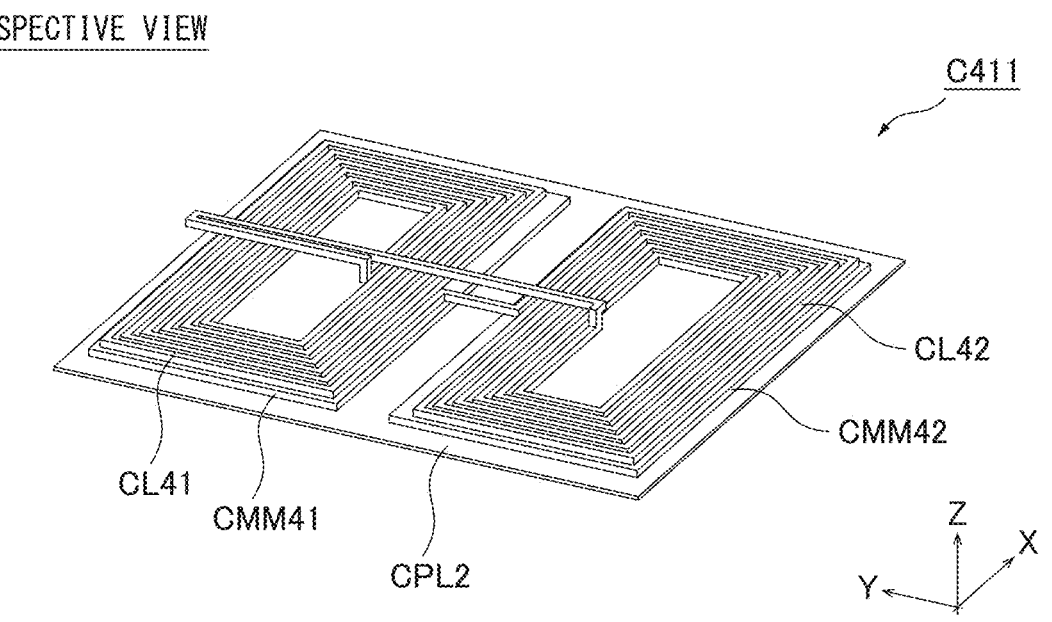
FIG. 13C is a perspective view illustrating a configuration of a power receiver coil C411 of the wireless power transfer system of target 2 for comparison.

FIG. 12A is a plan view illustrating a configuration of a power transmitter coil C311 of a wireless power transfer system, which is target 2 for comparison. FIG. 12B is a side view illustrating a configuration of a power transmitter coil C311 of a wireless power transfer system, which is target 2 for comparison. FIG. 12C is a perspective view illustrating a configuration of a power transmitter coil C311 of a wireless power transfer system, which is target 2 for comparison. FIG. 13A is a plan view illustrating a configuration of a power receiver coil C411 of the wireless power transfer system of target 2 for comparison. FIG. 13B is a side view illustrating a configuration of a power receiver coil C411 of the wireless power transfer system of target 2 for comparison. FIG. 13C is a perspective view illustrating a configuration of a power receiver coil C411 of the wireless power transfer system of target 2 for comparison.

The power transmitter coil C311 of the wireless power transfer system of target 2 for comparison illustrated in FIGS. 12A, 12B and 12C is different from the power transmitter coil 111 of the wireless power transfer system 10 according to the present embodiment of the present disclosure in that a bent portion for making coil widths of all longer sides of a pair of coils CL31 and CL32 to be substantially equal is not provided.

As illustrated in FIGS. 12A, 12B and 12C, the power transmitter coil C311 of the wireless power transfer system of target 2 for comparison includes a first coil unit being a pair of coils (coils CL31 and CL32), a first core unit being a pair of cores (cores CMM31 and CMM32), and an aluminum plate CPL1. The coils CL31 and CL32 each have, as illustrated in FIGS. 12A, 12B and 12C, a circular shape formed by being wound in a horizontal plane (X-Y plane). The coils CL31 and CL32 are connected to each other at one end thereof, and they are wound in such a way that the magnetic fields generated by currents are oriented oppositely to each other. In other words, the coil CL31 generates an upward magnetic field with respect to the vertical direction (Z-axis direction) while the coil CL32 generates a downward magnetic field with respect to the vertical direction (Z-axis direction). The coils CL31 and CL32 in the first coil unit are connected at points in outside diameter portions of the adjacent longer sides of the pair of coils CL31 and CL32, the longer sides being opposed to each other (in an area between the coils CL31 and CL32).

Since the power transmitter coil C311 of target 2 for comparison is not provided with a bent portion as provided in the present embodiment of the present disclosure, due to presence of a portion in the longer sides of the coils, the portion connecting the coils CL31 and CL32, coil widths (WO31 and WO32) of the longer sides of the coils that are not opposed are wider than coil widths (WI31 and WI32) of the opposing longer sides of the coils.

The cores CMM31 and CMM32 in the first core unit are made of a magnetic material and respectively induce magnetic fields generated by the coils CL31 and CL32 in the first coil unit. The cores CMM31 and CMM32 are typically composed of ferrite.

The cores CMM31 and CMM32 in the first core unit are respectively integrated with the coils CL31 and CL32 in the first coil unit, and the cores are arranged side by side spaced apart in the horizontal direction (Y-axis direction).

The aluminum plate CPL1 is disposed under the coils CL31 and CL32 and the cores CMM31 and CMM32, and reduces an effect of an external magnetic field on the power transmitter coil C311.

The power receiver coil C411 of the wireless power transfer system of target 2 for comparison illustrated in FIGS. 13A, 13B and 13C is different from the power receiver coil 211 of the wireless power transfer system 10 according to the present embodiment of the present disclosure in that a bent portion for making coil widths of all longer sides of a pair of coils CL41 and CL42 to be substantially equal is not provided.

As illustrated in FIGS. 13A, 13B and 13C, the power receiver coil C411 of the wireless power transfer system of target 2 for comparison includes a second coil unit being a pair of coils (coils CL41 and CL42), a second core unit being a pair of cores (cores CMM41 and CMM42), and an aluminum plate CPL2. The coils CL41 and CL42 each have, as illustrated in FIGS. 13A, 13B, 13C, a circular shape formed by being wound in a horizontal plane (X-Y plane). The coils CL41 and CL42 are connected to each other at one end thereof, and they are wound in such a way that the magnetic fields generated by currents are oriented oppositely to each other. The coils CL41 and CL42 in the second coil unit are connected at points in outside diameter portions of the adjacent longer sides of the pair of coils CL41 and CL42, the longer sides being opposed to each other (in an area between the coils CL41 and CL42).

Since the power receiver coil C411 of target 2 for comparison is not provided with a bent portion as provided in the present embodiment of the present disclosure, due to presence of a portion in the longer sides of the coils, the portion connecting the coils CL41 and CL42, coil widths (WO41 and WO42) of the longer sides of the coils that are not opposed are wider than coil widths (WI41 and WI42) of the opposing longer sides of the coils.

The cores CMM141 and CMM42 in the second core unit are made of a magnetic material and respectively induce magnetic fields generated by the coils CL41 and CL42 in the second coil unit. The cores CMM41 and CMM42 are typically composed of ferrite.

The cores CMM141 and CMM42 in the second core unit are respectively integrated with the coils CL41 and CL42 in the second coil unit, and the cores are arranged side by side spaced apart in the horizontal direction (Y-axis direction).

The aluminum plate CPL2 is disposed under the coils CL41 and CL42 and the cores CMM141 and CMM42, and reduces an effect of an external magnetic field on the power receiver coil C411.

Figure 14:
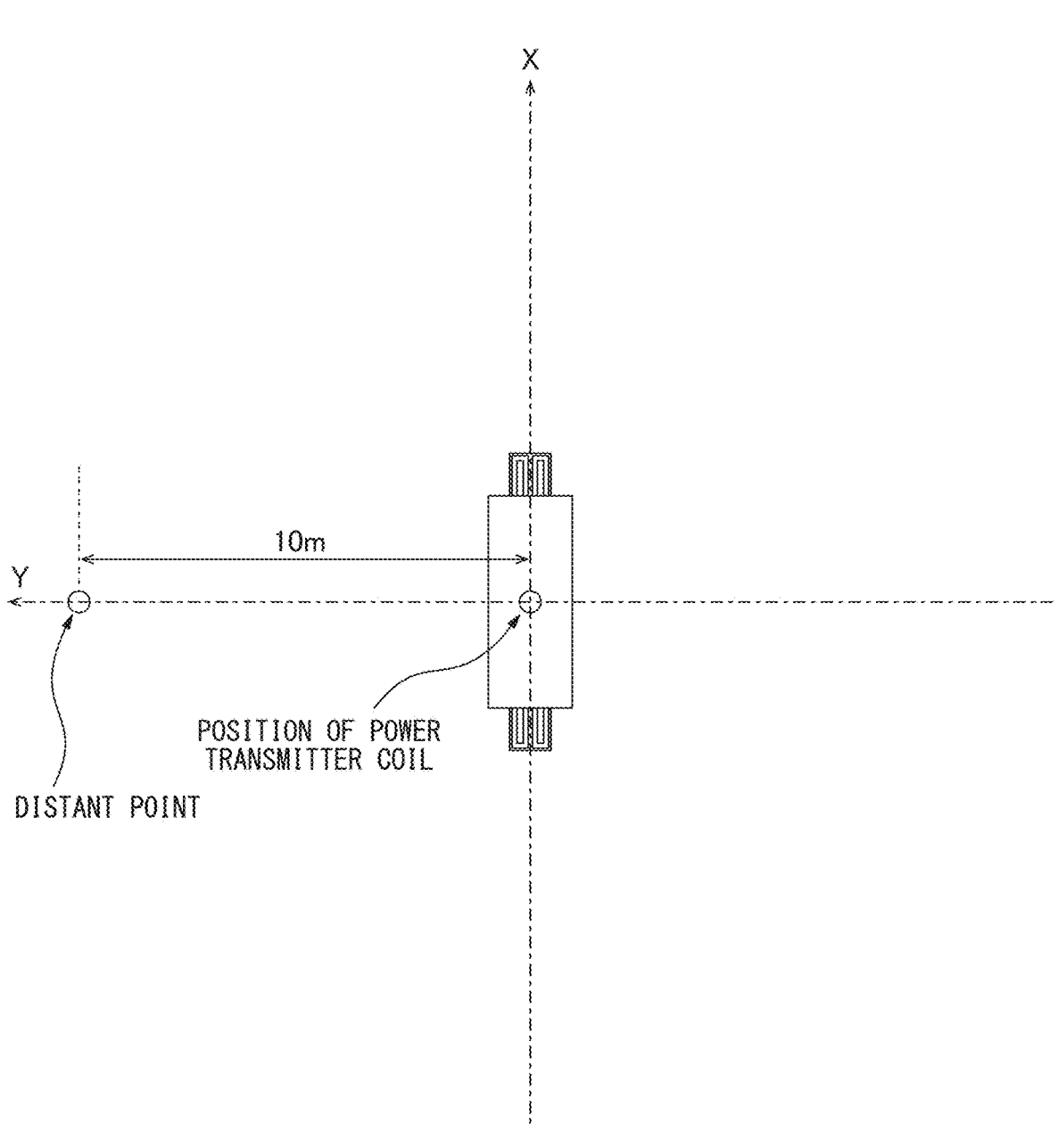
FIG. 14 is a diagram depicting a measurement point for a distant leakage magnetic field in the Y direction in the wireless power transfer system.
Figure 15:
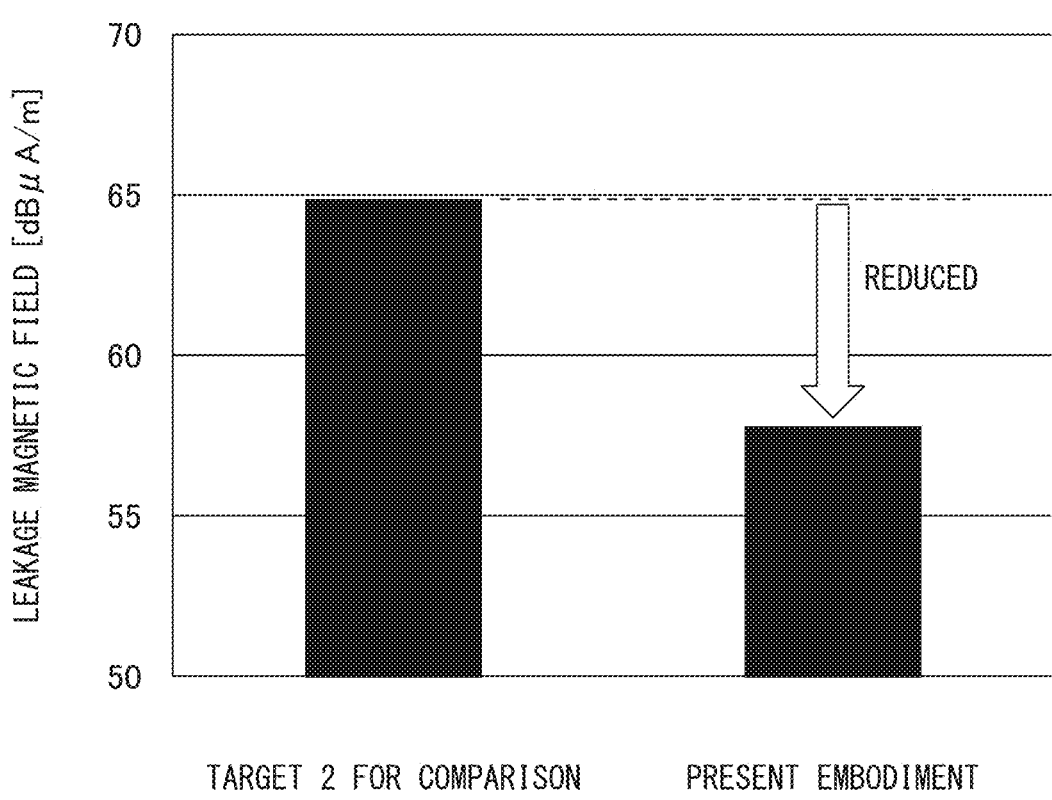
FIG. 15 is a diagram illustrating a comparison result of distant leakage magnetic fields in the Y direction at a 10 m point depicted in FIG. 14 in the wireless power transfer system of target 2 for comparison (FIGS. 12A, 12B and 12C and FIGS. 13A, 13B and 13C) and the wireless power transfer system 10 according to the present embodiment of the present disclosure (FIG. 1 to FIG. 5C).

FIG. 14 is a diagram depicting a measurement point for a distant leakage magnetic field in the Y direction in the wireless power transfer system. For example, when the movable object that will be the subject for charging is a vehicle and the power transmitter coils (first coil units) are arranged in a row on a road that will be the route traveled by the vehicle, assuming the center of the power transmitter coil as a starting point, a distant point that is about 10 m distant from the starting point in a vehicle width direction (Y-axis direction) perpendicular to the direction of travel of the vehicle (X-axis direction) is determined as a measurement point for the distant leakage magnetic field in the Y direction. FIG. 15 is a diagram illustrating a comparison result of distant leakage magnetic fields in the Y direction at a 10 m point depicted in FIG. 14 in the wireless power transfer system of target 2 for comparison (FIGS. 12A, 12B and 12C and FIGS. 13A, 13B and 13C) and the wireless power transfer system 10 according to the present embodiment of the present disclosure (FIG. 1 to FIG. 5C). It is found that, as illustrated in FIG. 15, the wireless power transfer system 10 according to the present embodiment of the present disclosure (FIG. 1 to FIG. 5C) reduces the distant leakage magnetic field by about 7 dB compared to the wireless power transfer system of target 2 for comparison (FIGS. 12A, 12B and 12C and FIGS. 13A, 13B and 13C) since the coil widths of all longer sides of the coils are equal.

FIG. 16A is a diagram illustrating legend of magnetic flux density in Y direction for FIGS. 16B and 16C. FIG. 16B is a diagram illustrating distributions of magnetic flux densities in the Y direction (vehicle width direction) inside a core of the power transmitter coil C311 of target 2 for comparison when power of 30 kW is transmitted. FIG. 16C is a diagram illustrating distributions of magnetic flux densities in the Y direction (vehicle width direction) inside a core of the power transmitter coil 111 according to the present embodiment of the present disclosure when power of 30 kW is transmitted. In the core of the power transmitter coil 111 according to the present embodiment of the present disclosure, since the coil width WO11 of the coil L11 and the coil width WI12 of the coil L12 are substantially equal, the magnetic fields generated by the pair of coils L11 and L12 are approximately equal in intensity and oppositely oriented as illustrated in FIGS. 16A, 16B and 16C, and the asymmetric property is low. In contrast, since the coil width WO31 of the coil CL31 and the coil width WI22 of the coil CL32 are different, the magnetic fields generated by the pair of coils CL31 and CL32 are oppositely oriented and have different intensities; as a result, an effect of canceling out a magnetic field by the oppositely oriented magnetic field between the coils CL31 and CL32 is reduced, and the magnetic fields are highly asymmetric and imbalanced.

4. Embodiment 2

Next, embodiment 2 of the present disclosure will be described, in which a connecting portion is provided on the side of the shorter sides of the pair of coils L11 and L12.

4-1. Power Transmitter Circuit and Power Receiver Circuit

4-1-1. Power Transmitter Circuit

Figures 17A, 17B, 17C:
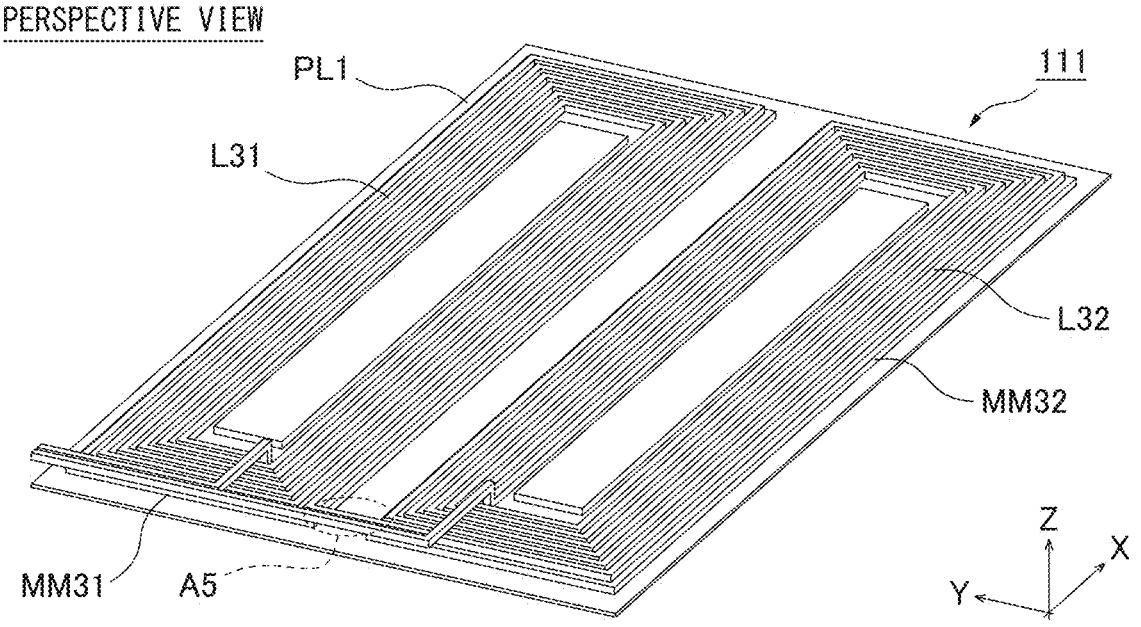
FIG. 17A is a plan view for explaining a configuration of the power transmitter circuit 110 according to embodiment 2 of the present disclosure.
FIG. 17B is a side view for explaining a configuration of the power transmitter circuit 110 according to embodiment 2 of the present disclosure.
FIG. 17C is a perspective view for explaining a configuration of the power transmitter circuit 110 according to embodiment 2 of the present disclosure.

FIGS. 17A, 17B and 17C are conceptual diagrams for explaining a configuration of a power transmitter circuit 110 according to embodiment 2 of the present disclosure. With respect to the power transmitter circuit 110 positioned on a horizontal plane (X-Y plane), FIG. 17A is a plan view viewed from a vertical direction (Z-axis direction), FIG. 17B is a side view viewed from a longitudinal direction (X-axis direction) on the horizontal plane, and FIG. 17C is a perspective view. The power transmitter circuit 110 is a resonant circuit constructed from the power transmitter coil 111 and the capacitors C11 and C12.

The power transmitter coil 111 includes a first coil unit being a pair of coils (coils L31 and L32), a first core unit being a pair of cores (cores MM31 and MM32), and an aluminum plate PL1. The coils L31 and L32 and the cores MM31 and MM32 are held by a plastic component or the like (not illustrated).

Each of the coils L31 and L32 in the first coil unit has, as illustrated in FIGS. 17A, 17B and 17C, a circular shape formed by being wound in a horizontal plane (X-Y plane). The coils L31 and L32 are connected to each other at one end thereof by a connecting portion A5, and they are wound in such a way that the magnetic fields generated by currents are oriented oppositely to each other. In other words, the coil L31 generates, for example, an upward magnetic field with respect to the vertical direction (Z-axis direction) while the coil L32 generates, for example, a downward magnetic field with respect to the vertical direction (Z-axis direction).

Each of the coils L31 and L32 in the first coil unit has two longer sides (in FIGS. 17A, 17B and 17C, the sides of the coil along the X-axis direction, which is a major axis direction) and two shorter sides (in FIGS. 17A, 17B and 17C, the sides of the coil along the Y-axis direction, which is a minor axis direction). The coils L31 and L32 in the first coil unit are connected to each other by the connecting portion A5 at points in outside diameter portions of the shorter sides of the pair of coils L31 and L32, the shorter sides being opposed to each other (in an area between the coils L31 and L32).

The cores MM31 and MM32 in the first core unit are made of a magnetic material and respectively induce magnetic fields generated by the coils L31 and L32 in the first coil unit. The cores MM31 and MM32 are typically composed of ferrite.

The cores MM31 and MM32 in the first core unit are respectively integrated with the coils L31 and L32 in the first coil unit, and the cores are arranged side by side spaced apart in the horizontal direction (Y-axis direction).

The aluminum plate PL1 is disposed under the coils L31 and L32 and the cores MM31 and MM32, and reduces an effect of an external magnetic field on the power transmitter circuit 110.

4-1-2 Power Receiver Circuit

Figure 18A:
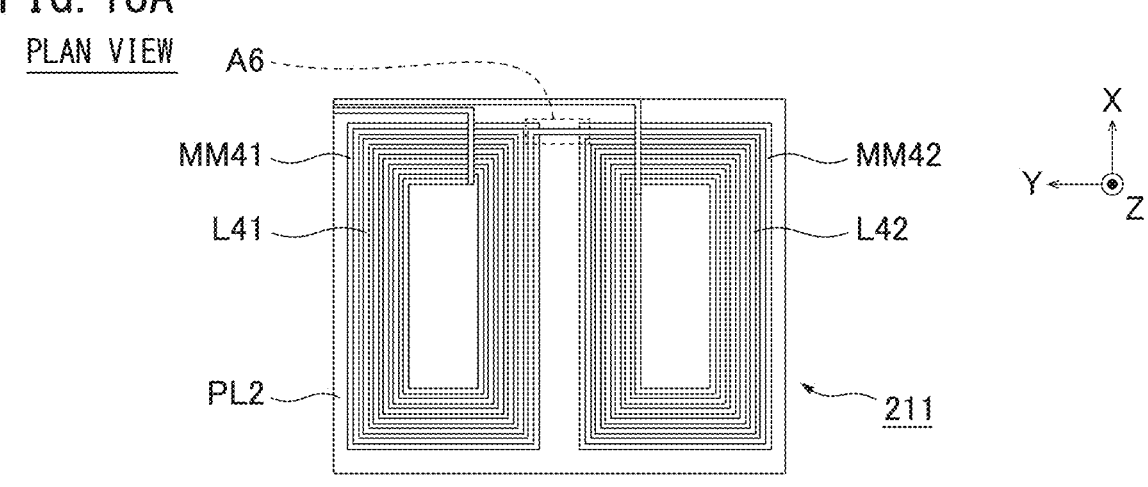
FIG. 18A is a plan view for explaining a configuration of the power receiver circuit 210 according to embodiment 2 of the present disclosure.
Figure 18B:
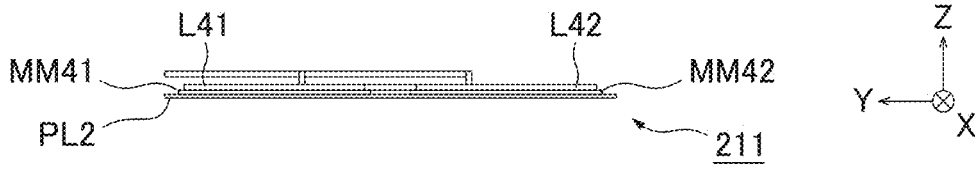
FIG. 18B is a side view for explaining a configuration of the power receiver circuit 210 according to embodiment 2 of the present disclosure.
Figure 18C:
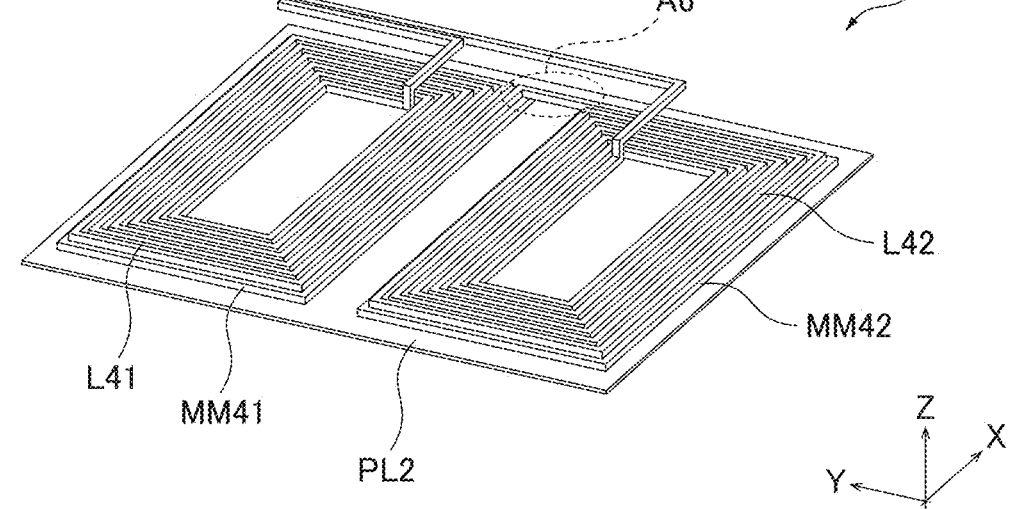
FIG. 18C is a perspective view for explaining a configuration of the power receiver circuit 210 according to embodiment 2 of the present disclosure.

FIGS. 18A, 18B and 18C are conceptual diagrams for explaining a configuration of a power receiver circuit 210 according to embodiment 2 of the present disclosure. With respect to the power receiver circuit 210 positioned on a horizontal plane (X-Y plane), FIG. 18A is a plan view viewed from a vertical direction (Z-axis direction), FIG. 18B is a side view viewed from a longitudinal direction (X-axis direction) on the horizontal plane, and FIG. 18C is a perspective view. The power receiver circuit 210 is a resonant circuit constructed from the power receiver coil 211 and the capacitors C21 and C22 as described earlier.

The power receiver coil 211 includes a second coil unit being a pair of coils (coils L41 and L42), a second core unit being a pair of cores (cores MM41 and MM42), and an aluminum plate PL2. The coils L41 and L42 and the cores MM41 and MM42 are held by a plastic component or the like (not illustrated).

Each of the coils L41 and L42 in the second coil unit has, as illustrated in FIGS. 18A, 18B and 18C, a circular shape formed by being wound in a horizontal plane (X-Y plane). The coils L41 and L42 are connected to each other at one end thereof by a connecting portion A6, and they are wound in such a way that the magnetic fields generated by currents are oriented oppositely to each other. In this way, the coils L41 and L42 in the second coil unit can respectively properly receive magnetic fields generated by the coils L31 and L32 in the first coil unit, which are oriented oppositely to each other.

Each of the coils L41 and L42 in the second coil unit has two longer sides (in FIGS. 18A, 18B and 18C, the sides of the coil along the X-axis direction, which is a major axis direction) and two shorter sides (in FIGS. 18A, 18B and 18C, the sides of the coil along the Y-axis direction, which is a minor axis direction). The coils L41 and L42 in the second coil unit are connected to each other by the connecting portion A6 at points in outside diameter portions of the shorter sides of the pair of coils L41 and L42, the shorter sides being opposed to each other (in an area between the coils L41 and L42).

The first coil unit (coils L31 and L32) of the power transmitter coil 111 and the second coil unit (coils L41 and L42) of the power receiver coil 211 are located to face each other. Therefore, as illustrated in FIGS. 17A, 17B and 17C and FIGS. 18A, 18B and 18C, when the first coil unit (coils L31 and L32) and the second coil unit (coils L41 and L42) of the power receiver coil 211 are located to face each other, the coil winding of the power receiver coil 211 from the coil L41 to the coil L42 via the connecting portion A6 is configured to be similarly routed to that of the power transmitter coil 111 from the coil L31 to the coil L32 via the connecting portion A5. Similarly, as illustrated in FIGS. 17A, 17B and 17C and FIGS. 18A, 18B and 18C, when the first coil unit (coils L31 and L32) and the second coil unit (coils L41 and L42) of the power receiver coil 211 are located to face each other, lead wires of the power receiver coil 211 that run from the second coil unit (coils L41 and L42) to the capacitor C21 and the capacitor C22 are configured to be similarly routed to those of the power transmitter coil 111 that run from the first coil unit (coils L31 and L32) to the capacitor C11 and the capacitor C12. In this way, increase in intensity of the distant leakage magnetic field in the X direction and intensity of the distant leakage magnetic field in the Y direction can be successfully reduced even further.

In addition, the length of the first coil unit in the major axis direction (in FIGS. 17A, 17B and 17C, the X-axis direction) is configured to be longer than the length of the second coil unit in the major axis direction (in FIGS. 18A, 18B and 18C, the X-axis direction). In contrast, the lengths of the first coil unit and the second coil unit in the minor axis direction (in FIGS. 17A, 17B and 17C and FIGS. 18A, 18B and 18C, the Y-axis direction) are configured to be equal. In this way, pulsation of the power received by the power receiver coil 211 can be reduced.

The cores MM41 and MM42 in the second core unit are made of a magnetic material and respectively induce magnetic fields generated by the coils L41 and L42 in the second coil unit. The cores MM41 and MM42 are typically composed of ferrite.

The cores MM41 and MM42 in the second core unit are respectively integrated with the coils L41 and L42 in the second coil unit, and the cores are arranged side by side spaced apart in the horizontal direction (Y-axis direction). To improve transmission efficiency, the second inter-core distance is desired to be substantially equal to the first inter-core distance.

The aluminum plate PL2 is disposed under the coils L41 and L42 and the cores MM41 and MM42, and reduces an effect of an external magnetic field on the power receiver circuit 210.

In embodiment 2 of the present disclosure, since the pair of coils are connected by the connecting portions A5 and A6 provided on outside diameter sides as illustrated in FIGS. 17A, 17B and 17C and FIGS. 18A, 18B and 18C, the wiring lengths in the connecting portions can be shortened compared to the connection method in target 1 for comparison illustrated in FIGS. 7A, 7B and 7C and FIGS. 8A, 8B and 8C; as a result, the degree of imbalance in the magnetic fields in the X direction at the shorter sides of the coils can be reduced. Note that, since the connecting portions A5 and A6 are positioned on the side of the shorter sides of the coils, magnetic fields in the X direction are slightly asymmetric compared to the embodiment illustrated in FIG. 1 to FIG. 5C.

4-2. Characteristics

Figure 19:
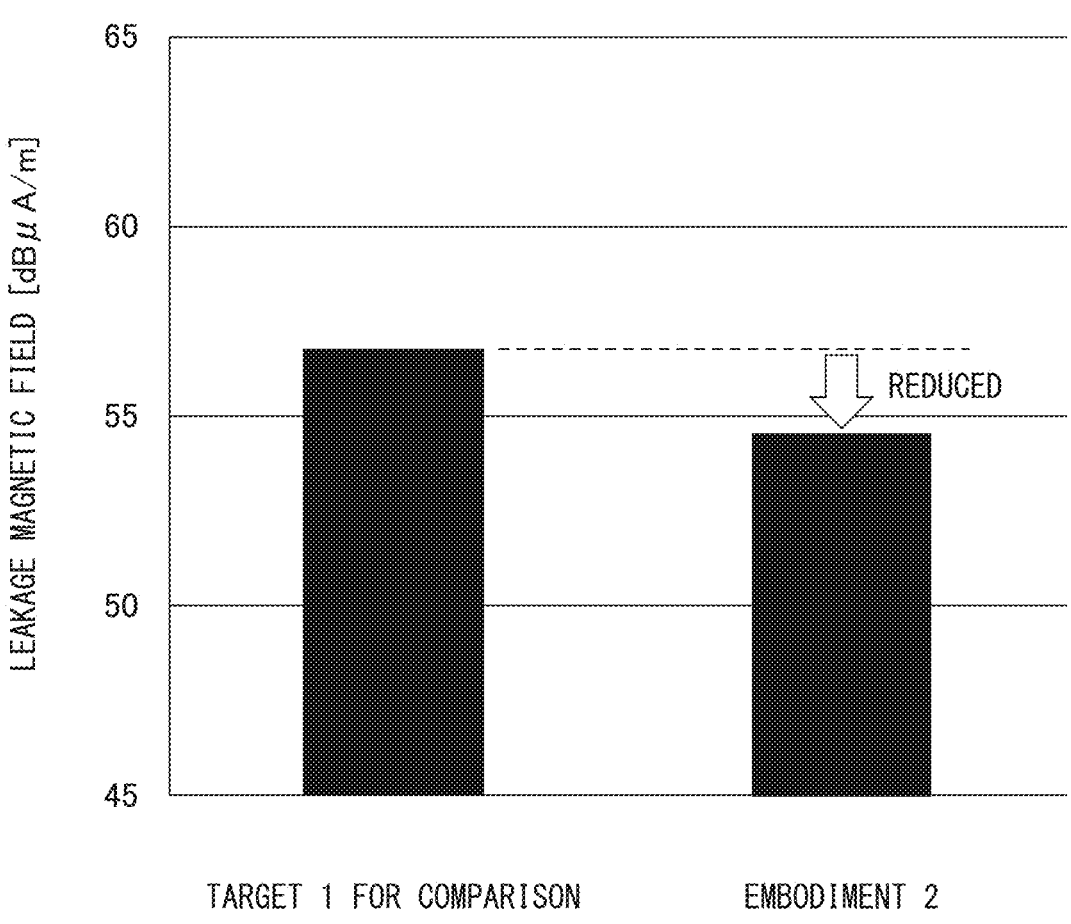
FIG. 19 is a diagram illustrating a comparison result of distant leakage magnetic fields in the X direction at a 10 m point depicted in FIG. 10 in the wireless power transfer system of target 1 for comparison (FIGS. 7A, 7B and 7C and FIGS. 8A, 8B and 8C) and the wireless power transfer system 10 according to embodiment 2 of the present disclosure (FIGS. 17A, 17B and 17C and FIGS. 18A, 18B and 18C).

FIG. 19 is a diagram illustrating a comparison result of distant leakage magnetic fields in the X direction at a 10 m point depicted in FIG. 10 in the wireless power transfer system of target 1 for comparison (FIGS. 7A, 7B and 7C and FIGS. 8A, 8B and 8C) and the wireless power transfer system 10 according to embodiment 2 of the present disclosure (FIGS. 17A, 17B and 17C and FIGS. 18A, 18B and 18C). It is found that, as illustrated in FIG. 19, the wireless power transfer system 10 according to embodiment 2 of the present disclosure (FIGS. 17A, 17B and 17C and FIGS. 18A, 18B and 18C) reduces the distant leakage magnetic field by about 3 dB compared to the wireless power transfer system of target 1 for comparison (FIGS. 7A, 7B and 7C and FIGS. 8A, 8B and 8C).

The inventors of the present application have found that by configuring the pair of coils included in each of the power transmitter coil and the power receiver coil to have a circular shape formed by being wound in a horizontal plane, providing the connecting portion configured to connect the coils in the pair of coils on the outside diameter sides of the adjacent longer sides of the pair of coils, the longer sides being opposed to each other, and bending and winding the coils to be substantially point-symmetric about a substantially central point of the connecting portion as a point of symmetry in such a way that the coil widths of all longer sides of the pair of coils are substantially equal, increase in physical sizes of the power transmitter coil and the power receiver coil is prevented, imbalance in magnetic fields generated by a connecting wire is prevented, and a leakage magnetic field is successfully reduced at the same time.

According to the present disclosure, a wireless power transfer system may be achieved in which increase in the physical size of the power transmitter coil and the power receiver coil is avoided and the leakage magnetic field can be successfully reduced at the same time.

All embodiments disclosed in the present disclosure are exemplary in all respects and shall not be considered to be limiting. The scope of the present disclosure is defined not by the description above but by the claims, and it is intended that any changes within the scope of the claims and equivalents thereof are included.

The invention claimed is:

1. A wireless power transfer system that wirelessly transfers power from a power transmitter coil to a power receiver coil, wherein the power transmitter coil and the power receiver coil each include a coil unit, the coil unit being a pair of coils arranged side by side in a horizontal direction, wherein each of the coils in the coil unit has a shape formed by being wound in a horizontal plane and the coils are configured in such a way that magnetic fields generated by currents are oriented oppositely to each other, wherein a connecting portion configured to connect the coils in the coil unit is provided on outside diameter sides of adjacent longer sides of the pair of coils, the longer sides being opposed to each other, and wherein the coils are bent and wound to be substantially point-symmetric about a substantially central point of the connecting portion as a point of symmetry in such a way that coil widths of all longer sides of the pair of coils are substantially equal.

2. The wireless power transfer system according to claim 1, wherein the power transmitter coil and the power receiver coil each include a core unit, the core unit being a pair of cores each configured to induce a magnetic field generated by each coil in the coil unit, and wherein each of the cores in the core unit is integrated with each coil in the coil unit and the cores are arranged spaced apart from each other.

* * * * *